(12) United States Patent
Mikuni et al.

(10) Patent No.: US 9,782,749 B2
(45) Date of Patent: Oct. 10, 2017

(54) ALUMINUM SILICATE, METAL ION ADSORBENT, AND METHOD FOR PRODUCING SAME

(75) Inventors: Hiroki Mikuni, Hitachi (JP); Kiyoshi Kawai, Hitachinaka (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 750 days.

(21) Appl. No.: 14/004,581

(22) PCT Filed: Dec. 7, 2011

(86) PCT No.: PCT/JP2011/078349
§ 371 (c)(1),
(2), (4) Date: Oct. 15, 2013

(87) PCT Pub. No.: WO2012/124222
PCT Pub. Date: Sep. 20, 2012

(65) Prior Publication Data
US 2014/0309106 A1 Oct. 16, 2014

(30) Foreign Application Priority Data

Mar. 11, 2011 (JP) .................................. 2011-054787
Mar. 11, 2011 (JP) .................................. 2011-054788
(Continued)

(51) Int. Cl.
*B01J 20/28* (2006.01)
*C01B 33/26* (2006.01)
(Continued)

(52) U.S. Cl.
CPC .......... *B01J 20/2808* (2013.01); *B01J 20/10* (2013.01); *B01J 20/16* (2013.01);
(Continued)

(58) Field of Classification Search
CPC B01J 20/10; B01J 20/28061; B01J 20/28069; B01J 20/3085; B01J 20/28078;
(Continued)

(56) References Cited

U.S. PATENT DOCUMENTS

2009/0321028 A1* 12/2009 Takaoka ................ D21H 11/18
162/146
2010/0028237 A1* 2/2010 Suzuki .................... C01B 33/26
423/328.1
2010/0320418 A1* 12/2010 Suzuki .................... B01D 53/02
252/194

FOREIGN PATENT DOCUMENTS

EP 2 138 227 A1 4/2008
EP 2 096 083 A1 9/2009
(Continued)

OTHER PUBLICATIONS

Weathering Process of Volcanic Glass to Allophane Determined by 27Al and 29Si Solid-State NMR, The clays minerals society, 2005 vol. 53 No. 4, pp. 401-408.*
(Continued)

*Primary Examiner* — Melvin C Mayes
*Assistant Examiner* — Smita Patel
(74) *Attorney, Agent, or Firm* — Fitch, Even, Tabin & Flannery, LLP

(57) ABSTRACT

The aluminum silicate of the invention has: an element ratio of Si and Al, represented by Si/Al, of from 0.3 to 1.0 by molar ratio; a peak at approximately 3 ppm in a $^{27}$Al-NMR spectrum; peak A at approximately −78 ppm and peak B at approximately −85 ppm in a $^{29}$Si-NMR spectrum; and a peak at approximately $2\theta=26.9°$ and a peak at approximately $2\theta=40.3°$ in a powder X-ray diffraction spectrum. The aluminum silicate has an area ratio of peak B with respect to peak A of from 2.0 to 9.0, or does not include a tubular substance having a length of 50 nm or more as observed in
(Continued)

a transmission electron microscope (TEM) photograph of the aluminum silicate taken at a magnification of 100,000. The aluminum silicate is produced by a method comprising: subjecting a reaction product of a silicate ion solution and an aluminum ion solution to desalting and solid separation; subjecting a resultant to a thermal treatment in an aqueous medium in the presence of an acid under concentration conditions in an aqueous medium such that a silicon atom concentration is 100 mmol/L or more and an aluminum atom concentration is 100 mmol/L or more; and subjecting a resultant to further desalting and solid separation.

19 Claims, 3 Drawing Sheets

(30)  Foreign Application Priority Data

Mar. 11, 2011 (JP) ................................ 2011-054857
Mar. 11, 2011 (JP) ................................ 2011-054858

(51) Int. Cl.
*C02F 1/28* (2006.01)
*B01J 20/10* (2006.01)
*B01J 20/30* (2006.01)
*B01J 20/16* (2006.01)
*C02F 101/20* (2006.01)

(52) U.S. Cl.
CPC ... *B01J 20/28061* (2013.01); *B01J 20/28069* (2013.01); *B01J 20/28078* (2013.01); *B01J 20/3085* (2013.01); *C01B 33/26* (2013.01); *C02F 1/281* (2013.01); *C01P 2002/72* (2013.01); *C01P 2006/12* (2013.01); *C01P 2006/14* (2013.01); *C01P 2006/16* (2013.01); *C02F 2101/20* (2013.01)

(58) Field of Classification Search
CPC ........ B01J 20/16; B01J 20/28; B01J 20/2808; C01P 2006/12; C01P 2006/14; C01P 2006/16; C01P 2002/72; C01B 33/26; C02F 2101/20

See application file for complete search history.

(56) References Cited

FOREIGN PATENT DOCUMENTS

| | | |
|---|---|---|
| EP | 2 233 438 A1 | 9/2010 |
| EP | 2 782 173 A1 | 9/2014 |
| JP | 2000-342962 A | 12/2000 |
| JP | 2002-159850 A | 6/2002 |
| JP | 2003-320216 A | 11/2003 |
| JP | 2003-334543 A | 11/2003 |
| JP | 2004-044828 A | 2/2004 |
| JP | 4113943 B2 | 7/2008 |
| WO | WO 2008/081605 A1 | 7/2008 |
| WO | WO 2010/026975 A1 | 3/2010 |

OTHER PUBLICATIONS

Molecular Dynamics Modeling of Tubular Aluminum Silicate: Imogolite, J. Phys. Chem. B 2002, 106, 271-278.*
Office Action of Chinese Appln. No. 201180069225.7 dated Sep. 14, 2015 with English translation.
Chinese office action of Appln. No. 201180069225.7 dated Nov. 2, 2014 with partial English translation.
EP Search Report of Appln. No. 11861291.0 Nov. 25, 2014 in English.
International Search Report, from International Bureau, issued in corresponding International Application No. PCT/JP2011/078349, mailed Mar. 13, 2012, 3 pages in Japanese, 4 pages in its English translation.
Written Opinion of the International Searching Authority, issued in issued in corresponding International Application No. PCT/JP2011/078349, dated Mar. 13, 2012, 4 pages in Japanese.

* cited by examiner

ALUMINUM SILICATE, METAL ION ADSORBENT, AND METHOD FOR PRODUCING SAME

TECHNICAL FIELD

The invention relates to an aluminum silicate, a metal ion adsorbent, and methods for producing the aluminum silicate and the metal ion adsorbent.

BACKGROUND

In recent years, removal of harmful substances such as free residual chlorine from drinking water has been desired. Further, since there are still many cases in which lead-containing materials are used for water pipes, there is demand for a water cleaner that has an excellent ability of removing heavy metal ions.

As an activated charcoal for removing heavy metals, for example, Japanese Patent Application Laid-Open (JP-A) No. 2003-334543 discloses a molded activated charcoal that is produced by molding a mixture of fiber-shaped activated charcoal, microparticles of an inorganic compound that has an ability of adsorbing heavy metals and has a particle size of from 0.1 μm to 90 μm, and a binder. In the molded activated charcoal, an aluminosilicate zeolite is used as the inorganic compound.

With regard to removal of heavy metal compounds that are included in general industrial wastes, waste products generated in a solvent production process, waste products generated in a synthetic rubber production process, laboratory wastes, medical wastes or household wastes, for example, JP-A No. 2000-342962 discloses a heavy metal adsorbent that is produced by bonding a compound having a chelate-forming group to a porous substance that is at least one selected from the group consisting of activated charcoal, zeolite, diatomite, natural sand and ceramics.

DISCLOSURE OF THE INVENTION

Problems to be Solved by the Invention

In view of the aforementioned, the invention aims to provide an aluminum silicate that has an excellent ability of adsorbing metal ions, a metal ion adsorbent that includes the aluminum silicate as a component, and methods of producing the aluminum silicate and the metal ion adsorbent.

Means for Solving the Problem

The invention includes the following embodiments.

<1> An aluminum silicate, having: an element ratio of Si and Al, represented by Si/Al, of from 0.3 to 1.0 by molar ratio; a peak at approximately 3 ppm in a $^{27}$Al-NMR spectrum; a peak at approximately −78 ppm and a peak at approximately −85 ppm in a $^{29}$Si-NMR spectrum; a peak at approximately 2θ=26.9° and a peak at approximately 2θ=40.3°, in a powder X-ray diffraction spectrum in which a CuKα ray is used as an X-ray source; and an area ratio of peak A and peak B, represented by peak B/peak A, of from 2.0 to 9.0, wherein peak A is at approximately −78 ppm and peak B is at approximately −85 ppm, in a $^{29}$Si-NMR spectrum.

<2> An aluminum silicate, having: an element ratio of Si and Al, represented by Si/Al, of from 0.3 to 1.0 by molar ratio; a peak at approximately 3 ppm in a $^{27}$Al-NMR spectrum; a peak at approximately −78 ppm and a peak at approximately −85 ppm in a $^{29}$Si-NMR spectrum; and a peak at approximately 2θ=26.9° and a peak at approximately 2θ=40.3°, in a powder X-ray diffraction spectrum in which a CuKα ray is used as an X-ray source, the aluminum silicate not comprising a tubular substance having a length of 50 nm or more as observed in a transmission electron microscope (TEM) photograph of the aluminum silicate taken at a magnification of 100,000.

<3> The aluminum silicate according to <1>, wherein the aluminum silicate does not comprise a tubular substance having a length of 50 nm or more as observed in a transmission electron microscope (TEM) photograph of the aluminum silicate taken at a magnification of 100,000.

<4> The aluminum silicate according to any one of <1> to <3>, wherein the aluminum silicate has a BET specific surface area of 250 m$^2$/g or more, a total pore volume of 0.1 cm$^3$/g or more, and an average pore diameter of 1.5 nm or more.

<5> The aluminum silicate according to any one of <1> to <4>, wherein the aluminum silicate further has peaks at approximately 2θ=18.8°, 20.3°, 27.8°, 40.6° and 53.3° in the powder X-ray diffraction spectrum.

<6> A metal ion adsorbent, comprising an aluminum silicate having: an element ratio of Si and Al, represented by Si/Al, of from 0.3 to 1.0 by molar ratio; a peak at approximately 3 ppm in a $^{27}$Al-NMR spectrum; and a peak at approximately −78 ppm and a peak at approximately −85 ppm in a $^{29}$Si-NMR spectrum.

<7> The metal ion adsorbent according to <6>, wherein the aluminum silicate has an area ratio of peak A and peak B, represented by peak B/peak A, of from 2.0 to 9.0, wherein peak A is at approximately −78 ppm and peak B is at approximately −85 ppm, in a $^{29}$Si-NMR spectrum.

<8> The metal ion adsorbent according to <6> or <7>, wherein the aluminum silicate does not comprise a tubular substance having a length of 50 nm or more as observed in a transmission electron microscope (TEM) photograph of the aluminum silicate taken at a magnification of 100,000.

<9> The metal ion adsorbent according to any one of <6> to <8>, wherein the aluminum silicate has a BET specific surface area of 250 m$^2$/g or more, a total pore volume of 0.1 cm$^3$/g or more, and an average pore diameter of 1.5 nm or more.

<10> The metal ion adsorbent according to any one of <6> to <9>, wherein the aluminum silicate has a peak at approximately 2θ=26.9° and a peak at approximately 2θ=40.3°.

<11> The metal ion adsorbent according to <10>, wherein the aluminum silicate further has peaks at approximately 2θ=18.8°, 20.3°, 27.8°, 40.6° and 53.3° in the powder X-ray diffraction spectrum.

<12> A method of producing the aluminum silicate according to any one of <1> to <5>, the method comprising:

(a) a process of obtaining a reaction product by mixing a solution that includes silicate ions and a solution that includes aluminum ions;

(b) a process of subjecting the reaction product to desalting and solid separation;

(c) a process of subjecting a resultant of the solid separation in process (b) to a thermal treatment in an aqueous medium in the presence of an acid, under concentration conditions such that a silicon atom concentration is 100 mmol/L or more and an aluminum atom concentration is 100 mmol/L or more; and (d) a process of subjecting a resultant of the thermal treatment in process (c) to desalting and solid separation.

<13> The method of producing the aluminum silicate according to <12>, wherein the resultant of the solid separation in process (b) has an electric conductivity of 4.0 S/m or less when the resultant is dispersed in water such that the concentration of the resultant is 60 g/L.

<14> The method of producing the aluminum silicate according to <12> or <13>, wherein the thermal treatment in process (c) is performed with a pH of from 3 to less than 7, at a temperature of from 80° C. to 160° C., and for a time of within 96 hours.

<15> The method of producing the aluminum silicate according to any one of <12> to <14>, wherein in process (a), the solution that includes silicate ions has a silicon atom concentration of 100 mmol/L or more, the solution that includes aluminum ions has an aluminum atom concentration of 100 mmol/L or more, and the mixing is performed such that an element ratio of aluminum with respect to silicon, represented by Si/Al, is from 0.3 to 1.0 by molar ratio.

<16> The method of producing the aluminum silicate according to any one of <12> to <15>, wherein process (b) comprises a process of obtaining a dispersion by dispersing the reaction product in an aqueous medium and a process of performing solid separation with a pH of the dispersion adjusted to from 5 to 7.

<17> A method of producing a metal ion adsorbent according to any one of <6> to <11>, the method comprising:

(a) a process of obtaining a reaction product by mixing a solution that includes silicate ions and a solution that includes aluminum ions;

(b) a process of subjecting the reaction product to desalting and solid separation;

(c) a process of subjecting a resultant of the solid separation in process (b) to a thermal treatment in an aqueous medium in the presence of an acid; and (d) a process of subjecting a resultant of the thermal treatment in process (c) to desalting and solid separation.

<18> The method of producing the aluminum silicate according to <17>, wherein the thermal treatment in process (c) is performed under concentration conditions in the aqueous medium such that a silicon atom concentration is 100 mmol/L or more and an aluminum atom concentration is 100 mmol/L or more.

<19> The method of producing the metal ion adsorbent according to <17> or <18>, wherein the resultant of the solid separation in process (b) has an electric conductivity of 4.0 S/m or less when the metal ion adsorbent is dispersed in water such that the concentration of the resultant is 60 g/L.

<20> The method of producing the metal ion adsorbent according to any one of <17> to <19>, wherein the thermal treatment in process (c) is performed with a pH of from 3 to less than 7, at a temperature of from 80° C. to 160° C., and for a time of within 96 hours.

<21> The method of producing the metal ion adsorbent according to <17> to <20>, wherein in process (a), the solution that includes silicate ions has a silicon atom concentration of 100 mmol/L or more, the solution that includes aluminum ions has an aluminum atom concentration of 100 mmol/L or more, and the mixing is performed such that an element ratio of aluminum with respect to silicon, represented by Si/Al, is from 0.3 to 1.0 by molar ratio.

<22> The method of producing the metal ion adsorbent according to <17> to <21>, wherein process (b) comprises a process of obtaining a dispersion by dispersing the reaction product in an aqueous medium and a process of performing solid separation while a pH of the dispersion adjusted to from 5 to 7.

Effect of the Invention

According to the invention, it is possible to provide an aluminum silicate that has an excellent ability of adsorbing metal ions, a metal ion adsorbent that includes the aluminum silicate as a component, and methods of producing the aluminum silicate and the metal ion adsorbent.

BEST MODE FOR IMPLEMENTING THE INVENTION

In the specification, the term "process" refers not only an independent process but also a process that cannot be clearly distinguished from another process, as long as an intended effect of the process is achieved. The numerical range described as "A to B" refers to a range that includes numbers A and B as a minimum value and a maximum value. Further, when there are plural substances that correspond to the same component, the amount thereof refers to the total amount of the substances, unless otherwise specified.

<Aluminum Silicate>

A first embodiment of the invention is an aluminum silicate, having: an element ratio of Si and Al, represented by Si/Al, of from 0.3 to 1.0 by molar ratio; a peak at approximately 3 ppm in a $^{27}$Al-NMR spectrum; a peak at approximately −78 ppm and a peak at approximately −85 ppm in a $^{29}$Si-NMR spectrum; and a peak at approximately 2θ=26.9° and a peak at approximately 2θ=40.3° in a powder X-ray diffraction spectrum in which a CuKα ray is used as an X-ray source. The aluminum silicate has an area ratio of peak A and peak B, represented by peak B/peak A, of from 2.0 to 9.0, wherein peak A is at approximately −78 ppm and peak B is at approximately −85 ppm, in a $^{29}$Si-NMR spectrum, or alternatively, does not include a tubular substance having a length of 50 nm or more as observed in a transmission electron microscope (TEM) photograph of the aluminum silicate taken at a magnification of 100,000.

The aluminum silicate of the first embodiment has a peak at approximately 2θ=26.9° and a peak at approximately 2θ=40.3° in a powder X-ray diffraction spectrum. The powder X-ray diffraction is performed by using a CuKα ray as an X-ray source. As a powder X-ray diffractometer, GEIGERFLEX RAD-2X (trade name) manufactured by Rigaku Corporation can be used, for example.

Figure 1:
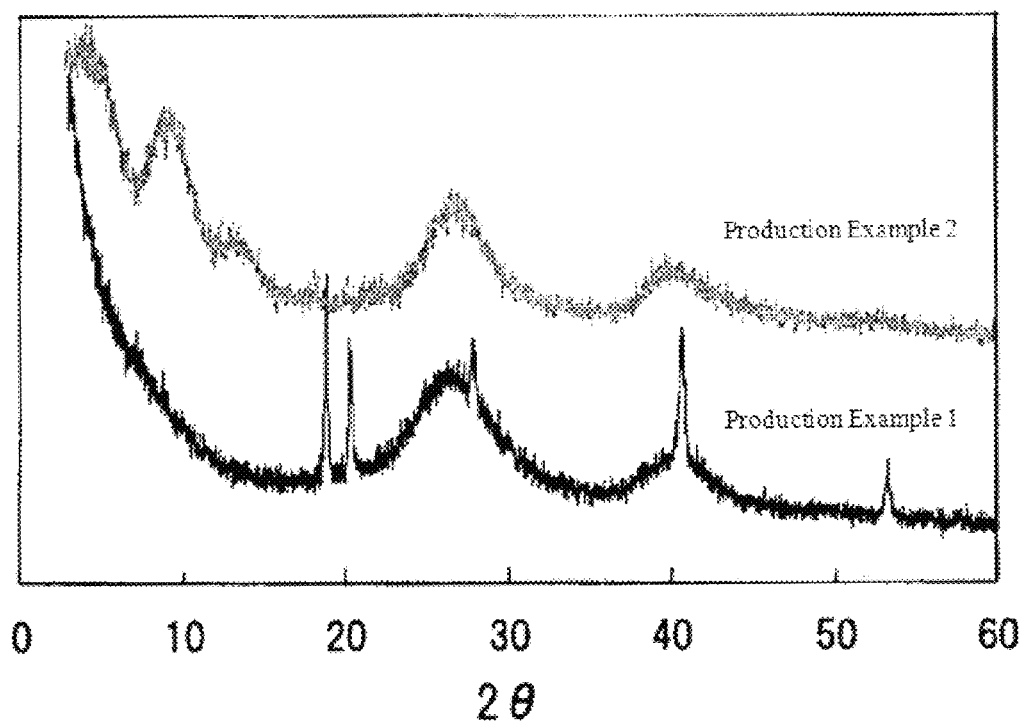
FIG. 1 is a powder X-ray diffraction spectrum of an aluminum silicate according to the present embodiment.

FIG. 1 shows a powder X-ray diffraction spectrum of an aluminum silicate according to Production Example 1 as an example of the aluminum silicate of the first embodiment.

For the purpose of comparison, a powder X-ray diffraction spectrum of an aluminum silicate according to Production Example 2, which is referred to as imogolite, is also described in FIG. 1.

As shown in FIG. 1, the aluminum silicate of the first embodiment has a peak at approximately 2θ=26.9° and a peak at approximately 2θ=40.3° in a powder X-ray diffraction spectrum. The peaks at approximately 2θ=26.9° and at approximately 2θ=40.3° are assumed to be peaks that derive from aluminum silicate of the first embodiment.

It is not necessary for the specific aluminum silicate according to the first embodiment to have a broad peak at approximately 2θ=20° and a peak at approximately 2θ=35° in a powder X-ray diffraction spectrum. The peaks at approximately 2θ=20° and at approximately 2θ=35° are assumed to be peaks that result from reflection at an hk0 surface of a low-crystallinity lamellar clay mineral.

The fact of not having peaks at approximately 2θ=20° and at approximately 2θ=35° indicates that the displacement from the base line at approximately 2θ=20° and 35° are below a noise level, i.e., that the displacement from the base line is 100% or less of a noise width.

The aluminum silicate according to the first embodiment may have peaks at approximately 2θ=18.8°, 20.3°, 27.8°, 40.6° and 53.3°. The peaks at approximately 2θ=18.8°, 20.3°, 27.8°, 40.6° and 53.3° are assumed to be peaks that derive from aluminum hydroxide that is generated as a by-product. It is possible to suppress precipitation of aluminum hydroxide by controlling the temperature in the thermal treatment in the method of producing an aluminum silicate to be 160° C. or less. Further, it is possible to control the content of aluminum hydroxide by adjusting the pH during performing desalting by centrifugation.

From the viewpoint of improving an ability of adsorbing metal ions, the aluminum silicate according to the first embodiment has an element ratio of Si and Al, represented by Si/Al, of from 0.3 to 1.0, preferably from 0.4 to 0.6, more preferably from 0.45 to 0.55, by molar ratio. When the molar ratio Si/Al is less than 0.3, the amount of Al that does not contribute to improve an ability of adsorption of the aluminum silicate becomes excessive, and when the molar ratio Si/Al is greater than 1.0, the amount of Si that does not contribute to improve an ability of adsorption of the aluminum silicate tends to become excessive.

The element ratio of Si and Al, represented by Si/Al, can be measured by an ordinary process with an ICP (Inductively Coupled Plasma) optical emission spectrometer (for example, P-4010, manufactured by Hitachi, Ltd.)

The aluminum silicate according to the first embodiment has a peak at approximately 3 ppm in a $^{27}$Al-NMR spectrum. As a device for measuring a $^{27}$Al-NMR spectrum, for example, AV400WB, manufactured by Bruker BioSpin K.K., can be used. The specific measurement conditions are as follows.

Figure 2:
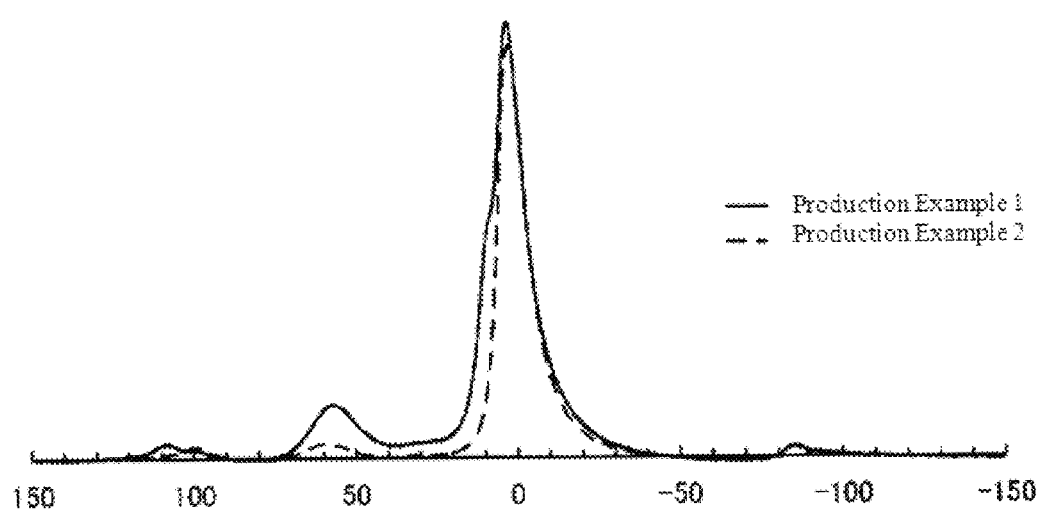
FIG. 2 is a $^{27}$Al-NMR spectrum of an aluminum silicate according to the present embodiment.

Resonance frequency: 104 MHz
Measurement method: MAS (single pulse)
MAS rotation rate: 10 kHz
Measurement range: 52 kHz
Number of data points: 4096
Resolution (measurement range/number of data points): 12.7 Hz
Pulse width: 3.0 μsec
Delay time: 2 seconds
Chemical shift standard: α-alumina, 3.94 ppm
Window function: exponent function
Line broadening factor: 10 Hz FIG. 2 shows a $^{27}$Al-NMR spectrum of an aluminum silicate according to Production Example 1 as an example of an aluminum silicate of the first embodiment. For the purpose of comparison, FIG. 2 also shows a $^{27}$Al-NMR spectrum of an aluminum silicate according to Production Example 2, which is referred to as imogolite.

As shown in FIG. 2, the aluminum silicate according to the first embodiment has a peak at approximately 3 ppm in a $^{27}$Al-NMR spectrum. The peak at approximately 3 ppm is assumed to be a peak that derives from 6-coordination Al. The aluminum silicate may further have a peak at approximately 55 ppm. The peak at approximately 55 ppm is assumed to be a peak that derives from 4-coordination Al.

The aluminum silicate according to the first embodiment preferably has an area ratio of a peak at approximately 55 ppm with respect to a peak at approximately 3 ppm of 25% or less, more preferably 20% or less, further preferably 15% or less, in a $^{27}$Al-NMR spectrum.

Further, from the viewpoint of metal ion adsorptivity and metal ion selectivity, the aluminum silicate according to the first embodiment preferably has an area ratio of a peak at approximately 55 ppm with respect to a peak at approximately 3 ppm of 1% or more, more preferably 5% or more, further preferably 10% or more, in a $^{27}$Al-NMR spectrum.

The aluminum silicate according to the first embodiment has a peak at approximately −78 ppm and a peak at approximately −85 ppm in a $^{29}$Si-NMR spectrum. As a device for measuring a $^{29}$Si-NMR spectrum, for example, AV400WB, manufactured by Bruker BioSpin K.K., can be used. The specific measurement conditions are as follows.

Figure 3:
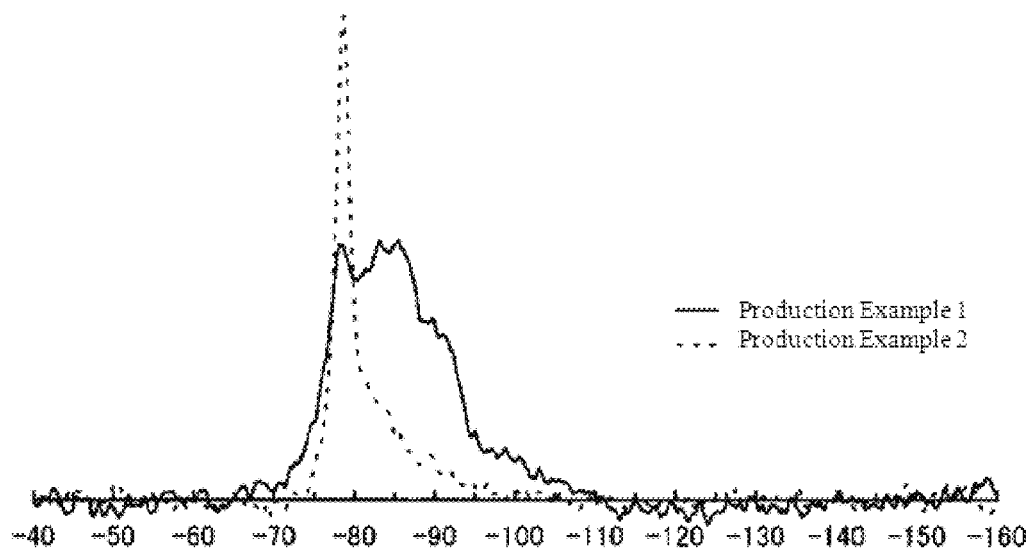
FIG. 3 is a $^{29}$Si-NMR spectrum of an aluminum silicate according to the present embodiment.

Resonance frequency: 79.5 MHz
Measurement method: MAS (single pulse)
MAS rotation rate: 6 kHz
Measurement range: 24 kHz
Number of data points: 2048
Resolution (measurement range/number of data points): 5.8 Hz
Pulse width: 4.7 μsec
Delay time: 600 seconds
Chemical shift standard: TMSP-d$_4$(sodium 3-(trimethylsilyl)(2,2,3,3-$^2$H$_4$) propionate), 1.52 ppm
Window function: exponent function
Line broadening factor: 50 Hz FIG. 3 shows a $^{29}$Si-NMR spectrum of an aluminum silicate according to Production Example 1 as an example of an aluminum silicate of the first embodiment. For the purpose of comparison, FIG. 3 also shows a $^{29}$Si-NMR spectrum of an aluminum silicate according to Production Example 2, which is referred to as imogolite.

As shown in FIG. 3, the aluminum silicate according to the first embodiment has a peak at approximately −78 ppm and a peak at approximately −85 ppm in a $^{29}$Si-NMR spectrum. Peak A, which appears at approximately −78 ppm, is assumed to derive from an aluminum silicate having a crystal structure such as imogolite or allophanes, i.e., from a structure of HO—Si—(OAl)$_3$. Peak B, which appears at approximately −85 ppm, is assumed to be an aluminum silicate having a clay structure or an aluminum silicate having an amorphous structure. Therefore, the aluminum silicate according to the first embodiment is assumed to be a mixture or a complex of an aluminum silicate having a crystal structure and an aluminum silicate having a clay structure or an amorphous structure.

The aluminum silicate according to the first invention satisfies either one of having an area ratio of peak A at approximately −78 ppm with respect to peak B at approximately −85 ppm in a $^{29}$Si-NMR spectrum, represented by peak B/peak A, of from 2.0 to 9.0; or not including a tubular substance having a length of 50 nm or more as observed in a transmission electron microscope (TEM) photograph of the aluminum silicate taken at a magnification of 100,000.

In order to calculate the area ratio of the peaks in a $^{29}$Si-NMR spectrum, a base line is drawn in the $^{29}$Si-NMR spectrum. In FIG. 3, a straight line that connects −55 ppm and −140 ppm is defined as the base line.

Next, the base line is divided at a chemical shift value that corresponds to a turning point of a peak at approximately −78 ppm and a peak at approximately −85 ppm (approximately −81 ppm in FIG. 3).

In FIG. 3, the area of peak A at approximately −78 ppm is an area of a region surrounded by the base line and a straight line that orthogonally crosses the chemical shift axis at −81 ppm. The area of peak B is an area of a region surrounded by the base line and a straight line that orthogonally crosses the chemical shift axis at −81 ppm.

It is also possible to calculate the area of the peaks with an analysis software that is installed in the NMR measurement device.

From the viewpoint of improvement in metal ion adsorptivity, the area ratio of peak B/peak A calculated from the areas of peaks A and B obtained by the above process is from 2.0 to 9.0, preferably from 2.0 to 7.0, more preferably from 2.0 to 5.0, further preferably from 2.0 to 4.0.

In a case in which fibers of so-called imogolite, which is an aluminum silicate having a tubular shape, in a transmission electron microscope (TEM) photograph, the area of peak B tends to be small.

Figure 4:
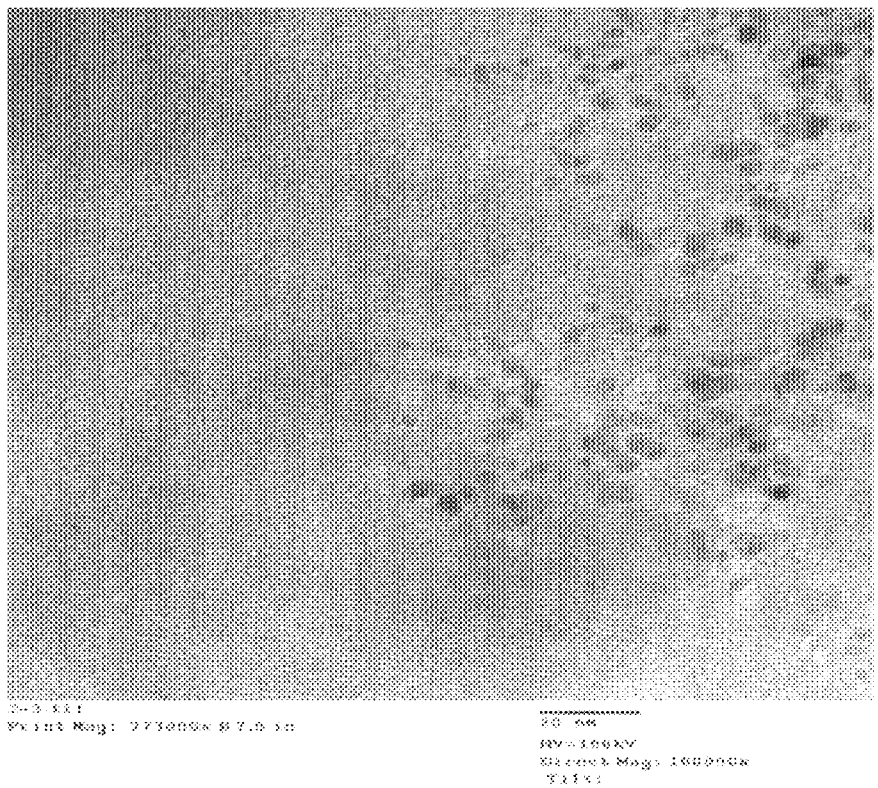
FIG. 4 is a transmission electron microscope (TEM) photograph of an aluminum silicate according to the present embodiment.
Figure 5:
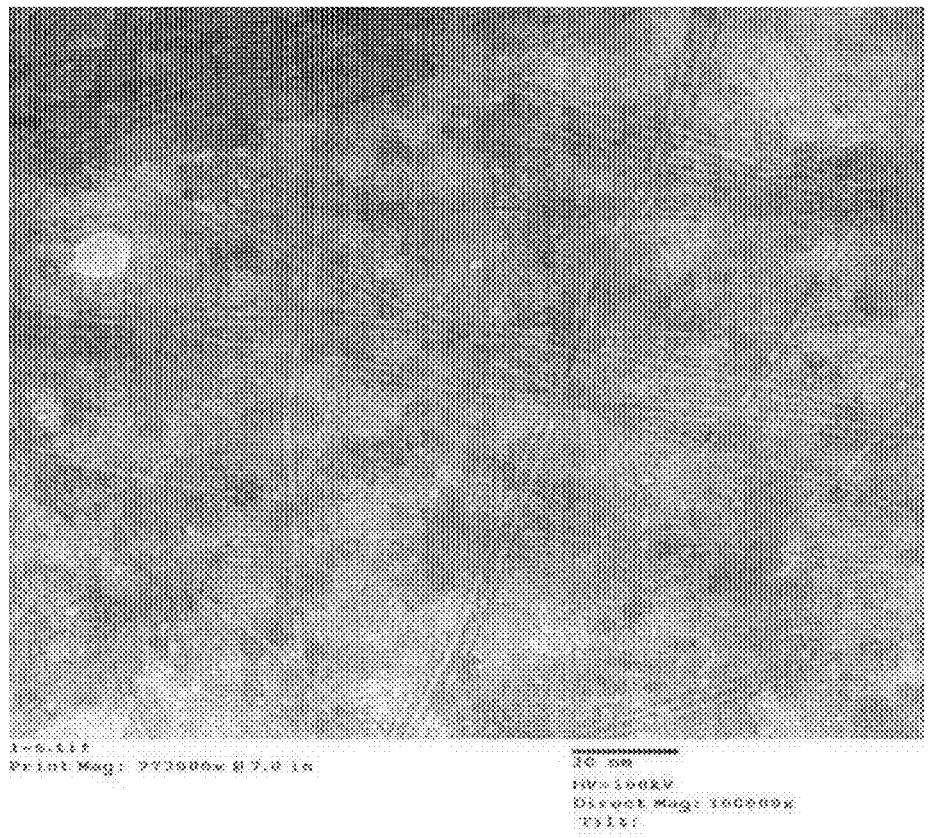
FIG. 5 is transmission electron microscope (TEM) photograph of so-called imogolite.

FIG. 4 shows an example of a transmission electron microscope (TEM) photograph of an aluminum silicate. The aluminum silicate shown in FIG. 4 is an aluminum silicate according to Production Example 1. For the purpose of comparison, FIG. 5 shows an example of a transmission electron microscope (TEM) photograph of an aluminum silicate according to Production Example 2, which is referred to as imogolite. As shown in FIG. 4, in a case of an aluminum silicate of the first embodiment, a tubular substance having a length of 50 nm or more does not exist as observed with a transmission electron microscope (TEM) at a magnification of 100,000.

The observation of an aluminum silicate with a transmission electron microscope (TEM) is performed at an accelerating voltage of 100 kV. The sample for observation is a thin membrane that is obtained by dropping a solution after a thermal treatment and prior to a second washing process (desalting and solid separation) onto a support for TEM measurement sample preparation, and drying the same. In a case in which the TEM image is insufficient in contrast, the solution after the thermal treatment is diluted as appropriate so that a sufficient contrast is achieved.

From the viewpoint of improvement in metal ion adsorptivity, the aluminum silicate according to the first embodiment preferably has a BET specific surface area of 200 m$^2$/g or more, more preferably 250 m$^2$/g or more, further preferably 280 m$^2$/g or more. The upper limit of the BET specific surface area is not specifically restricted. From the viewpoint that part of Si and Al in the aluminum silicate are bonded to each other in the form of Si—O—Al and contribute to improvement in metal ion adsorptivity, the BET specific surface area is preferably 1500 m$^2$/g or less, more preferably 1200 m$^2$/g or less, further preferably 1000 m$^2$/g or less.

The BET specific surface area of the aluminum silicate is measured from nitrogen adsorptivity in accordance with JIS Z 8830. As the measurement device, for example, AUTOSORB-1 (trade name), manufactured by Quantachrome Instruments can be used. Since it is thought that moisture that is adsorbed to a surface or in a structure of a sample may affect gas adsorptivity, a pretreatment of removing moisture by heating is performed prior to measuring the BET specific surface area.

In the pretreatment, a measurement cell including 0.05 g of a measurement sample is subjected to decompression with a vacuum pump to 10 Pa or less, heated at 110° C., and retained for 3 hours or more. While maintaining the decompressed state, the measurement cell is naturally cooled to room temperature (25° C.). After the pretreatment, the BET specific surface area is measured at a measurement temperature of 77K and at a measurement pressure range of less than 1 in terms of a relative pressure (an equilibrium pressure with respect to a saturation vapor pressure).

From the viewpoint of improvement in metal ion adsorptivity, the aluminum silicate according to the first embodiment preferably has a total pore volume of 0.1 cm$^3$/g or more, more preferably 0.12 cm$^3$/g or more, further preferably 0.15 cm$^3$/g or more. The upper limit of the total pore volume is not particularly restricted. In view of the fact that part of Si and Al are bonded to each other in the form of Si—O—Al and contribute to improvement in metal ion absorptivity, the total pore volume is preferably 1.5 cm$^3$/g or less, more preferably 1.2 cm$^3$/g or less, further preferably 1.0 cm$^3$/g or less.

The total pore volume of the aluminum silicate is calculated by converting a gas adsorption amount to a liquid, in which the gas adsorption amount is closest to relative pressure 1 among the data obtained within a range of from 0.95 to less than 1, based on the BET specific surface area.

From the viewpoint of improvement in metal ion adsorptivity, the aluminum silicate according to the first embodiment preferably has an average pore diameter of 1.5 nm or more, more preferably 1.7 nm or more, further preferably 2.0 nm or more. From the viewpoint of improvement in metal ion adsorptivity, the upper limit of the total pore volume is 50 nm or less, more preferably 20 nm or less, further preferably 5.0 nm or less.

The average pore diameter of the aluminum silicate is calculated based on an assumption that the total pores constitute a single pore having a cylindrical shape, based on the BET specific surface area and the total pore volume.

<Method of Producing Aluminum Silicate>

The aluminum silicate according to the first embodiment can be produced by the method as described below. The method of producing the aluminum silicate includes:

(a) a process of obtaining a reaction product by mixing a solution that includes silicate ions and a solution that includes aluminum ions;

(b) a process of subjecting the reaction product to desalting and solid separation;

(c) a process of subjecting a resultant of the solid separation in process (b) to a thermal treatment in an aqueous medium in the presence of an acid, under concentration conditions such that a silicon atom concentration is 100 mmol/L or more and an aluminum atom concentration is 100 mmol/L or more; and (d) a process of subjecting a resultant of the thermal treatment in process (c) to desalting and solid separation. The method may include other processes as necessary.

By subjecting the solution including a reaction product of silicate ions and aluminum ions to a thermal treatment at a higher concentration than a case of producing imogolite in the presence of an acid, after removing coexisting ions from the solution including a reaction product of silicate ions and aluminum ions by desalting, an aluminum silicate that exhibits excellent metal ion adsorptivity can be efficiently produced.

The reason for this is thought to be as follows. Generally, when a thermal treatment of aluminum silicate in the presence of an acid is performed in a thin solution, an aluminum silicate having a tubular shape in which a regular structure exists in a continuous manner is formed. However, according to the method of the invention in which a thermal treatment is performed at high concentration, an aluminum silicate having a clay structure and an aluminum silicate having an amorphous structure are formed, in addition to a regular partial structure. It is though that the aluminum silicate exhibits excellent adsorptivity with respect to metal ions due to the presence of various structures. Accordingly, it is presumed that the aluminum silicate according to the first embodiment has various structures as mentioned above, instead of growing into a tubular structure having a length of 50 nm or more.

(a) Process of Obtaining Reaction Product

In the process of obtaining a reaction product, a mixed solution that includes an aluminum silicate and coexisting ions is obtained as a reaction product by mixing a solution including silicate ions and a solution including aluminum ions.

(Silicate Ions and Aluminum Ions)

In order to synthesize an aluminum silicate, silicate ions and aluminum ions are required as the raw materials. The silicate source that constitutes a solution including silicate ions (hereinafter, also referred to as a "silicate solution") is not particularly limited as long as it generates silicate ions upon solvation. Examples of the silicate source include sodium orthosilicate, sodium metasilicate and tetraalkoxysilane such as tetraethoxysilane, but the silicate source is not limited thereto.

The aluminum source that constitutes a solution that includes aluminum ions (hereinafter, also referred to as an "aluminum solution") is not particularly limited as long as it generates aluminum ions upon solvation. Examples of the aluminum source include aluminum chloride, aluminum perchlorate, aluminum nitrate and aluminum sec-butoxide, but the aluminum source is not limited thereto.

The solvent may be appropriately selected from those that readily form a solvated state with a silicate source and an aluminum source as the raw materials. Specific examples include water and ethanol. From the viewpoint of readily reducing coexisting ions in a solvent during a thermal treatment, and from the viewpoint of handleability, water is preferred.

(Mixture Ratio and Concentration of Solutions)

After preparing raw material solutions (silicate solution and aluminum solution) by dissolving the raw materials in a solvent, respectively, a mixed solution is obtained by mixing the raw material solutions. The element ratio of Si and Al in the mixed solution (Si/Al) based on a molar ratio is adjusted to a range of from 0.3 to 1.0, preferably from 0.4 to 0.6, more preferably from 0.45 to 0.55, in order to conform to an element ratio of Si and Al (Si/Al) of an aluminum silicate to be obtained. By adjusting the element ratio Si/Al to be a range of from 0.3 to 1.0, it tends to become easy to synthesize an aluminum silicate having a desired regular structure.

The mixing of the raw material solutions is preferably performed by gradually adding a silicate solution to an aluminum solution. In this way, polymerization of silicic acid, which may inhibit formation of a desired aluminum silicate, can be suppressed.

The silicon atom concentration of the silicate solution is not particularly limited, and preferably from 100 mmol/L to 1000 mmol/L.

When the silicon atom concentration of the silicate solution is 100 mmol/L or more, productivity is improved and an aluminum silicate can be efficiently produced. When the silicon atom concentration of the silicate solution is 1000 mmol/L or less, productivity is further improved depending on the silicon atom concentration of the silicate solution.

The aluminum atom concentration of the aluminum solution is not particularly limited, and preferably from 100 mmol/L to 1000 mmol/L.

When the aluminum atom concentration of the aluminum solution is 100 mmol/L or more, productivity is improved and an aluminum silicate can be efficiently produced. When the aluminum atom concentration of the aluminum solution is 1000 mmol/L or less, productivity is further improved in accordance with the aluminum atom concentration of the aluminum solution.

First Washing Process (Desalting and Solid Separation)

After generating an aluminum silicate that includes coexisting ions as a reaction product by mixing a solution that includes silicate ions and a solution that includes aluminum ions, a first washing process of subjecting the aluminum silicate that includes coexisting ions to desalting and solid separation is performed. In the first washing process, the concentration of coexisting ions in the mixed solution is lowered by removing at least part of the coexisting ions from the mixed solution. By performing the first washing process, it tends to become easy to form an aluminum silicate having a desired regular structure in the synthesis process.

In the first washing process, the method of performing desalting and solid separation is not particularly limited as long as at least part of anions other than silicate ions (such as chloride ions or nitrate ions) and cations other than aluminum ions (such as sodium ions), which derive from a silicate source and an aluminum source, can be removed (desalting) and solid separation can be performed. Examples of the method for the first washing process include a method of using centrifugation, a method of using a dialytic membrane, and a method of using an ion exchange resin.

The first washing process is preferably performed in such a manner that the concentration of coexisting ions is not greater than a predetermined concentration. Specifically, for example, the first washing process is preferably performed in such a manner that a dispersion, which is prepared by dispersing a resultant of the solid separation in pure water so that the concentration of the resultant is 60 g/L, has an electric conductivity of 4.0 S/m or less, more preferably from 1.0 mS/m to 3.0 S/m, further preferably from 1.0 mS/m to 2.0 S/m.

When the electric conductivity of the dispersion is 4.0 S/m or less, it tends to become easy to form a desired aluminum silicate in the synthesis process.

The electric conductivity of the dispersion is measured at room temperature (25° C.) with F-55, manufactured by Horiba, Ltd., and a standard electric conductivity cell (9382-10D, manufactured by Horiba, Ltd.)

The first washing process preferably includes a process of obtaining a dispersion by dispersing the aluminum silicate in an aqueous medium and a process of adjusting the pH of the dispersion to 5 to 7 to allow an aluminum silicate to precipitate.

For example, in a case in which the first washing process is performed by centrifugation, the process may be as follows. The pH of the mixed solution is adjusted to 5 to 7 by adding an alkali or the like. After subjecting the solution with a pH that has been adjusted to centrifugation, a gel-like precipitation is obtained by solid separation by eliminating a supernatant. The precipitation obtained by the solid separation is redispersed in a solvent. The dispersion obtained by the redispersion preferably has the same volume as the dispersion prior to the solid separation. The dispersion obtained by the redispersion is subjected to further desalting and solid separation in a similar manner by centrifugation. Through the process, the concentration of coexisting ions becomes not greater than a predetermined concentration.

In the first washing process, the pH is adjusted to be from 5 to 7, for example. The pH is preferably from 5.5 to 6.8, more preferably from 5.8 to 6.5. The alkali used for the pH adjustment is not particularly limited. For example, sodium hydroxide, ammonia or the like is preferably used.

The conditions for centrifugation may be appropriately selected according to the production scale, the type of the container to be used for centrifugation, or the like. For example, the centrifugation can be performed at 1200 G or more for a time of from 1 to 30 minutes. Specifically, for example, in a case in which a centrifugal separation machine (Suprema 23, manufactured by Tomy Seiko Co. Ltd.) and a standard rotor (NA-16, manufactured by Tomy Seiko Co. Ltd.) are used, the centrifugation may be performed at room temperature, at 3000 rpm (1450 G) or more, for a time of from 5 to 10 minutes.

The solvent used in the first washing process may be appropriately selected from those that readily form a solvated state with the raw materials. Specific examples include water and ethanol. Water is preferred in view of reducing coexisting ions in the solution during thermal synthesis, and from the viewpoint of handleability, and pure water is more preferred. In a case in which washing is repeated plural times, it is preferred to omit pH adjustment.

The number of performing desalting and solid separation in the first washing process may be determined as appropriate according to the remaining amount of coexisting ions. For example, the number of the first washing process may be from 1 to 6. When the washing is repeated approximately three times, the remaining amount of coexisting ions may be reduced so that the coexisting ions do not affect the synthesis of an aluminum silicate.

The measurement of pH for pH adjustment may be performed with a pH meter using a standard glass electrode. Specific examples of the pH meter include MODEL (F-51) (trade name), manufactured by Horiba, Ltd.

(c) Synthesis Process

In the synthesis process, a thermal treatment is performed in an aqueous medium in the presence of an acid, under concentration conditions such that a silicon atom concentration is 100 mmol/L or more and an aluminum atom concentration is 100 mmol/L or more.

In a conventional production method, an aluminum silicate is grown into a tubular shape by performing a thermal treatment in a thin solution. According to the conventional production method, there is a limit to improvement in productivity because the thermal treatment is performed in a thin solution. However, according to the production method of the invention, since a thermal treatment is performed under the conditions in which concentrations of silicon atoms and aluminum atoms are equal to or greater than the specified concentrations, it is possible to produce an aluminum silicate that exhibits excellent metal ion adsorptivity and has a structure that is different from a tubular structure, with high productivity.

After the first washing process, concentrations of silicon atoms and aluminum atoms in a resultant of solid separation are adjusted to be within predetermined ranges.

In the invention, the silicon atom concentration is 100 mmol/L or more and the aluminum atom concentration is 100 mmol/L or more. Preferably, the silicon atom concentration is from 120 mmol/L to 2000 mmol/L and the aluminum atom concentration is from 120 mmol/L to 2000 mmol/L. More preferably, the silicon atom concentration is from 150 mmol/L to 1500 mmol/L and the aluminum atom concentration is from 150 mmol/L to 1500 mmol/L.

In a case in which the silicon atom concentration is less than 100 mmol/L or the aluminum atom concentration is less than 100 mmol/L, it may be difficult to obtain a desired aluminum silicate. Further, productivity of an aluminum silicate tends to be low.

The silicon atom concentration and the aluminum atom concentration as described above are that of after adjusting the pH to a predetermined range by adding an acidic compound.

The silicon atom concentration and the aluminum atom concentration are measured by an ordinary method with an ICP optical emission spectrometer (for example, P-4010, manufactured by Hitachi, Ltd.)

In order to adjust the silicon atom concentration and the aluminum atom concentration to the predetermined concentrations, a solvent may be added. The solvent may be selected as appropriate from those that readily form a solvated state with the raw materials. Specific examples of the solvent include water and ethanol. Water is preferred from the viewpoint of reducing coexisting ions in a solution during thermal synthesis, and from the viewpoint of handleability.

In the process of synthesis, at least one acidic compound is added prior to performing a thermal treatment. The pH after the addition of an acidic compound is not particularly limited. From the viewpoint of efficiently obtaining a desired aluminum silicate, the pH is preferably from 3 to less than 7, more preferably from 3 to 5.

The acidic compound to be added in the synthesis process is not particularly limited, and may be an organic acid or an inorganic acid. The acidic compound is preferably an inorganic acid. Specific examples of the inorganic acid include hydrochloric acid, perchloric acid and nitric acid. In consideration of reducing coexisting ions in the solution in the thermal treatment, an acidic compound that generates an anion that is similar to an anion included in an aluminum source is preferred.

By performing a thermal treatment after adding an acidic compound, an aluminum silicate that has a desired structure can be obtained.

The temperature for the thermal treatment is not particularly limited. From the viewpoint of efficiently obtaining a desired aluminum silicate, the temperature is preferably from 80° C. to 160° C.

When the temperature for the thermal treatment is 160° C. or lower, precipitation of boehmite (aluminum hydroxide) tends to be suppressed. When the temperature for the thermal treatment is 80° C. or higher, the rate of synthesis of a desired aluminum silicate may improve and production thereof may be more efficient.

The time for the thermal treatment is not particularly limited. From the viewpoint of obtaining an aluminum silicate having a desired structure more efficiently, the time is preferably not greater than 96 hours (4 days).

When the time for the thermal treatment is 96 hours or less, an aluminum silicate having a desired structure can be produced more efficiently.

(d) Second Washing Process (Desalting and Solid Separation)

The resultant obtained by performing a thermal treatment in the synthesis process is subjected to desalting and solid separation in the second washing process. By performing the second washing process, an aluminum silicate that exhibits excellent metal ion adsorptivity can be obtained. The reason for this is thought to be as follows. In a case of a resultant obtained by performing a thermal treatment in the synthesis process, adsorption sites of an aluminum silicate may be covered with coexisting ions, and the metal adsorption adsorptivity may be less than expected. Therefore, by performing a second washing process in which at least part of coexisting ions are removed by desalting and solid separation from an aluminum silicate obtained by performing a thermal treatment in the synthesis process, it is thought that an aluminum silicate that exhibits excellent metal ion adsorptivity can be obtained.

The second washing process may be the same or different from the first washing process that is performed prior to the synthesis process, as long as at least part of anions other than silicate ions and at least part of cations other than aluminum ions can be removed.

The second washing process is preferably performed such that the concentration of coexisting ions is not greater than a predetermined concentration. Specifically, for example, the second washing process is preferably performed such that a dispersion, which is obtained by dispersing a resultant of the solid separation performed in the second washing process in pure water so that the concentration of the resultant is 60 g/L, has an electric conductivity of 4.0 S/m or less, more preferably from 1.0 mS/m to 3.0 S/m, further preferably from 1.0 mS/m to 2.0 S/m.

When the electric conductivity of the dispersion is 4.0 S/m or less, an aluminum silicate that exhibits even more excellent metal ion adsorptivity tends to be readily obtained.

In a case in which the second washing process is performed by centrifugation, for example, the process can be performed as follows. The pH is adjusted to 5 to 10 by adding an alkali or the like to a mixed solution. After subjecting the solution with the adjusted pH to centrifugation, a gel-like precipitation is obtained by solid separation by eliminating a supernatant. The precipitation obtained by the solid separation is redispersed in a solvent. The dispersion obtained by the redispersion preferably has the same volume as the dispersion prior to being subjected to the solid separation. The dispersion obtained by the redispersion is subjected to further desalting and solid separation in a similar manner by centrifugation. Through the process, the concentration of coexisting ions becomes not greater than a predetermined concentration.

In the second washing process, the pH is adjusted to be from 5 to 10, for example, preferably from 8 to 10. The alkali used for the pH adjustment is not particularly limited. For example, sodium hydroxide, ammonia or the like is preferably used.

The conditions for centrifugation may be appropriately selected according to the production scale, the type of the container to be used for centrifugation, or the like. For example, the centrifugation can be performed at 1200 G or more for a time of from 1 to 30 minutes. Specifically, for example, in a case in which a centrifugal separation machine (Suprema 23, manufactured by Tomy Seiko Co. Ltd.) and a standard rotor (NA-16, manufactured by Tomy Seiko Co. Ltd.) are used, the centrifugation may be performed at room temperature, at 3000 rpm (1450 G) or more, for a time of from 5 to 10 minutes.

The solvent used in the second washing process may be appropriately selected from those that readily form a solvated state with the raw materials. Specific examples include water and ethanol. Water is preferred in view of reducing coexisting ions in the solution during thermal synthesis, and from the viewpoint of handleability, and pure water is more preferred. In a case in which washing is repeated plural times, it is preferred to omit pH adjustment.

The number of performing desalting and solid separation in the second washing process may be determined as appropriate according to the remaining amount of coexisting ions. Preferably, the number of performing the first washing process is from 1 to 6. When the washing is repeated approximately three times, the remaining amount of coexisting ions in an aluminum silicate may be sufficiently reduced.

In the dispersion after performing the second washing process, it is especially preferred that the concentrations of chloride ions and sodium ions, which may affect adsorptivity of an aluminum silicate, are reduced. Specifically, the aluminum silicate after subjecting to washing in the second washing process preferably has a chloride ion concentration of 100 mg/L or less and a sodium ion concentration of 100 mg/L or less when an aqueous dispersion is prepared by dispersing the aluminum silicate in water such that the concentration of the aluminum silicate is 400 mg/L. When the chloride ion concentration is 100 mg/L or less and a sodium ion concentration is 100 mg/L or less, adsorptivity can be even more improved. The chloride ion concentration is more preferably 50 mg/L or less, further preferably 10 mg/L or less. The sodium ion concentration is more preferably 50 mg/L or less, further preferably 10 mg/L or less. The chloride ion concentration and the sodium ion concentration may be adjusted by the number of times of performing a washing process or the type of an alkali to be used for pH adjustment.

The chloride ion concentration and the sodium ion concentration may be measured by an ordinary method by an ion chromatography system (for example, DX-320 and DX-100, manufactured by Dionex Corporation).

The concentration of an aluminum silicate in the dispersion is based on the mass of a solid obtained by drying a resultant of the solid separation at 110° C. for 24 hours as a standard.

The "dispersion after the second washing process" refers to a dispersion whose volume is adjusted with a solvent to be the same as the volume prior to the second washing process. The solvent may be selected as appropriate from those that readily form a solvated state with the raw materials. Specific examples include water and ethanol. The solvent is preferably water from the viewpoint of reducing coexisting ions in the aluminum silicate, and from the viewpoint of handleability.

The BET specific surface area of the aluminum silicate may be adjusted by a method for performing the second washing process (for example, a method of performing one or more treatments that include adding an alkali to a synthesis solution to adjust the pH to 5 to 10, subjecting the solution to centrifugation, obtaining an aluminum silicate as a gel-like precipitate by eliminating a supernatant, redispersing the aluminum silicate in a solvent, and adjusting the volume to that prior to the centrifugation).

The total pore volume of the aluminum silicate may be adjusted by a method for performing the second washing process (for example, a method of performing one or more treatments that include adding an alkali to a synthesis solution to adjust the pH to 5 to 10, subjecting the solution to centrifugation, obtaining an aluminum silicate as a gel-like precipitate by eliminating a supernatant, redispersing the aluminum silicate in a solvent, and adjusting the volume to that prior to the centrifugation).

The average pore diameter of the aluminum silicate may be adjusted by a method for performing the second washing process (for example, a method of performing one or more times a process that includes adding an alkali to a synthesis solution to adjust the pH to 5 to 10, subjecting the solution to centrifugation, obtaining an aluminum silicate as a gel-like precipitate by eliminating a supernatant, redispersing the aluminum silicate in a solvent, and adjusting the volume to that prior to the centrifugation).

<Purposes>

The aluminum silicate according to the first embodiment is useful as an adsorbent with respect to metal ions. More specifically, the aluminum silicate effectively adsorbs nickel ions, copper ions, manganese ions and the like.

<Metal Ion Adsorbent>

The metal ion adsorbent according to the second embodiment of the invention includes an aluminum silicate as a component. The aluminum silicate according to the second embodiment has an element ratio of Si and Al, represented by Si/Al, of from 0.3 to 1.0 by molar ratio; a peak at approximately 3 ppm in a $^{27}$Al-NMR spectrum; and a peak at approximately −78 ppm and a peak at approximately −85 ppm in a $^{29}$Si-NMR spectrum.

From the viewpoint of improving metal ion adsorptivity, the aluminum silicate according to the second embodiment has an element ratio of Si and Al, represented by Si/Al, of from 0.3 to 1.0 by molar ratio, preferably from 0.4 to 0.6, more preferably from 0.45 to 0.55. When the Si/Al is less than 0.3 by molar ratio, the amount of Al that does not contribute to improvement in adsorptivity of the aluminum silicate tends to be excessive, and when the Si/Al is greater than 1.0 by molar ratio, the amount of Si that does not contribute to improvement in adsorptivity of the aluminum silicate tends to be excessive.

The element ratio of Si and Al, represented by Si/Al, can be measured by an ordinary process with an ICP optical emission spectrometer (for example, P-4010, manufactured by Hitachi, Ltd.)

The aluminum silicate according to the second embodiment has a peak at approximately 3 ppm in a $^{27}$Al-NMR spectrum. As a device for measuring a $^{27}$Al-NMR spectrum, for example, AV400WB, manufactured by Bruker BioSpin K.K., can be used. The specific measurement conditions are as follows.

Resonant frequency: 104 MHz
Measurement method: MAS (single pulse)
MAS rotation number: 10 kHz
Measurement area: 52 kHz
Number of data points: 4096
Resolution (measurement area/number of data points): 12.7 Hz
Pulse interval: 3.0 μsec
Delay time: 2 seconds
Chemical shift standard: α-alumina, 3.94 ppm
Window function: exponent function
Line Broadening factor: 10 Hz FIG. 2 shows a $^{27}$Al-NMR spectrum of an aluminum silicate according to Production Examples 1 and 2 as an example of an aluminum silicate according to the second embodiment.

As shown in FIG. 2, the aluminum silicate according to the second embodiment has a peak at approximately 3 ppm in a $^{27}$Al-NMR spectrum. The peak at approximately 3 ppm is assumed to be a peak that derives from 6-coordination Al. The aluminum silicate may further have a peak at approximately 55 ppm. The peak at approximately 55 ppm is assumed to be a peak that derives from 4-coordination Al.

The aluminum silicate according to the second embodiment preferably has an area ratio of a peak at approximately 55 ppm with respect to a peak at approximately 3 ppm of 25% or less, more preferably 20% or less, further preferably 15% or less, in a $^{27}$Al-NMR spectrum.

Further, from the viewpoint of metal ion adsorptivity and metal ion selectivity, the aluminum silicate according to the present embodiment preferably has an area ratio of a peak at approximately 55 ppm with respect to a peak at approximately 3 ppm of 1% or more, more preferably 5% or more, further preferably 10% or more, in a $^{27}$Al-NMR spectrum.

The aluminum silicate according to the second embodiment has a peak at approximately −78 ppm and a peak at approximately −85 ppm in a $^{29}$Si-NMR spectrum. As a device for measuring a $^{29}$Si-NMR spectrum, for example, AV400WB, manufactured by Bruker BioSpin K.K., can be used. The specific measurement conditions are as follows.

Resonant frequency: 79.5 MHz
Measurement method: MAS (single pulse)
MAS rotation number: 6 kHz
Measurement area: 24 kHz
Number of data points: 2048
Resolution (measurement area/number of data points): 5.8 Hz
Pulse width: 4.7 μsec
Delay time: 600 seconds
Chemical shift standard: TMSP-d$_4$(3-(trimethylsilyl)(2,2,3,3-$^2$H$_4$) propionic acid sodium salt, 1.52 ppm
Window function: exponent function
Line Broadening factor: 50 Hz FIG. 3 shows a $^{29}$Si-NMR spectrum of an aluminum silicate according to Production Examples 1 and 2 as an example of an aluminum silicate according to the second embodiment.

As shown in FIG. 3, the aluminum silicate according to the second embodiment has a peak at approximately −78 ppm and a peak at approximately −85 ppm in a $^{29}$Si-NMR spectrum. Peak A, which appears at approximately −78 ppm, is assumed to derive from an aluminum silicate having a crystal structure such as imogolite or allophanes. Peak B, which appears at approximately −85 ppm, is assumed to be an aluminum silicate having a clay structure or an aluminum silicate having an amorphous structure. Therefore, the aluminum silicate according to the second embodiment is assumed to be a mixture or a complex of an aluminum silicate having a crystal structure and an aluminum silicate having a clay structure or an amorphous structure.

From the viewpoint of improvement in metal ion absorptivity, the aluminum silicate according to the second embodiment preferably has an area ratio of peak A that appears at approximately −78 ppm and peak B that appears at approximately −103.8 ppm in a $^{29}$Si-NMR spectrum (peak B/peak A) of from 0.4 to 9.0, more preferably from 1.5 to 9.0, further preferably from 2.0 to 9.0, yet further preferably from 2.0 to 7.0, yet further preferably from 2.0 to 5.0, particularly preferably from 2.0 to 4.0.

In order to calculate the area ratio of the peaks in a $^{29}$Si-NMR spectrum, a base line is drawn in the $^{29}$Si-NMR spectrum. In FIG. 3, a straight line that connects −55 ppm and −140 ppm is the base line.

Next, the base line is divided at a chemical shift value that corresponds to a turning point of a peak at approximately −78 ppm and a peak at approximately −85 ppm (approximately −81 ppm in FIG. 3).

In FIG. 3, the area of peak A at approximately −78 ppm is an area of a region surrounded by the base line and a straight line that orthogonally crosses the chemical shift axis at −81 ppm. The area of peak B is an area of a region surrounded by the base line and a straight line that orthogonally crosses the chemical shift axis at −81 ppm.

It is also possible to calculate the area of the peaks with an analysis software that is installed in the NMR measurement device.

FIGS. 4 and 5 show an example of a transmission electron microscope (TEM) photograph of an aluminum silicate according to the second embodiment. The aluminum silicate shown in FIG. 4 is an aluminum silicate according to Production Example 1. The aluminum silicate shown in FIG. 5 is an aluminum silicate according to Production Example 2.

As shown in FIG. 4, an aluminum silicate according to Production Example 1 does not have a tubular substance having a length of 50 nm or more as observed with a transmission electron microscope (TEM) at a magnification of 100,000. An aluminum silicate according to Production Example 2 is so-called imogolite that has a tubular shape, as shown in FIG. 5.

The observation of an aluminum silicate with a transmission electron microscope (TEM) is performed at an accelerating voltage of 100 kV. The sample for observation is a thin membrane that is obtained by dropping a solution after a thermal treatment and prior to a second washing process (desalting and solid separation) onto a support for TEM measurement sample preparation, and drying the same. In a case in which the TEM image is insufficient in contrast, the sample is prepared by diluting a solution after the thermal treatment, such that a sufficient contrast is achieved.

The tubular substance as shown in FIG. 5 is generated by performing a thermal treatment such that the silicate ion concentration and the aluminum ion concentration are not greater than the predetermined concentrations in the method of producing an aluminum silicate. The aluminum silicate that does not have a tubular substance as shown in FIG. 4 is prepared by performing a thermal treatment such that the silicate ion concentration and the aluminum ion concentration are greater than the predetermined concentrations.

Figure 6:
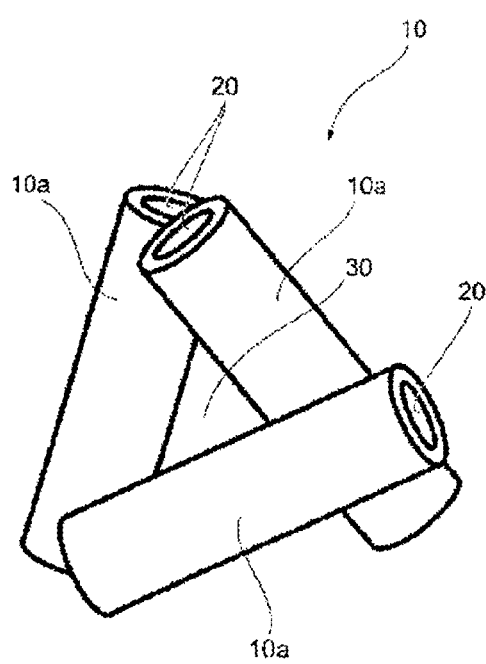
FIG. 6 is a schematic drawing of so-called imogolite having a tubular shape according to the present embodiment.

FIG. 6 is a schematic view of an example of an aluminum silicate according to the second embodiment, which is so-called imogolite having a tubular structure. As shown in FIG. 6, imogolite tends to form a fiber structure formed of tubular objects 10a, and inside walls 20 of tubular objects 10a or outside walls (outer periphery) of tubular objects 10a, which form a void 30 among tubular objects 10a, can be utilized as an adsorption site for metal ions. The length of tubular objects 10a in a lengthwise direction is, for example, from 1 nm to 10 μm. The tubular objects 10a have, for example, a cylindrical shape with an outer diameter of, for example, from 1.5 to 3.0 nm, and an inside diameter of, for example, from 0.7 to 1.4 nm.

When a fiber of so-called imogolite, which is a tubular aluminum silicate, is observed in a transmission electron microscope (TEM) photograph, the area of peak B in a $^{29}$Si-NMR spectrum tends to be small.

The aluminum silicate of the second embodiment preferably has a peak at approximately 2θ=26.9° and a peak at approximately 2θ=40.3° in a powder X-ray diffraction spectrum. The powder X-ray diffraction is performed by using a CuKα ray as an X-ray source. As a powder X-ray diffractometer, GEIGERFLEX RAD-2X (trade name) manufactured by Rigaku Corporation may be used, for example.

FIG. 1 shows a powder X-ray diffraction spectrum of an aluminum silicate according to Production Examples 1 and 2 as an example of the aluminum silicate according to the second embodiment.

As shown in FIG. 1, the aluminum silicate according to the second embodiment has a peak at approximately 2θ=26.9° and a peak at approximately 2θ=40.3° in a powder X-ray diffraction spectrum. The peaks at approximately 2θ=26.9° and at approximately 2θ=40.3° are assumed to be peaks that derive from aluminum silicate of the first embodiment.

Further, as with the case of an aluminum silicate according to Production Example 1, the aluminum silicate according to the second embodiment may have peaks at approximately 2θ=18.8°, 20.3°, 27.8°, 40.6° and 53.3°. The peaks at approximately 2θ=18.8°, 20.3°, 27.8°, 40.6° and 53.3° are assumed to be peaks that derive from an aluminum hydroxide that is generated as a by-product. It is possible to suppress precipitation of aluminum hydroxide by controlling the temperature in the thermal treatment in the method of producing an aluminum silicate to be 160° C. or less. Further, it is possible to control the content of aluminum hydroxide by adjusting the pH during performing desalting by centrifugation.

Further, as with the case of an aluminum silicate according to Production Example 2, the aluminum silicate according to the second embodiment may have peaks at approximately 2θ=4.8°, 9.7° and 14.0°. The aluminum silicate may also have a peak at approximately 2θ=18.3°. The peaks at approximately 2θ=4.8°, 9.7°, 14.0° and 18.3° are assumed to be peaks that derive from a fascicular structure formed of single fibers of so-called imogolite, which is a tubular aluminum silicate, that are positioned parallel to each other and become massed together.

From the viewpoint of improvement in metal ion adsorptivity, the aluminum silicate according to the second embodiment preferably has a BET specific surface area of 200 m$^2$/g or more, more preferably 250 m$^2$/g or more, further preferably 280 m$^2$/g or more. The upper limit of the BET specific surface area is not specifically restricted. From the viewpoint that part of Si and Al in the aluminum silicate are bonded to each other in the form of Si—O—Al and contribute to improvement in metal ion adsorptivity, the BET specific surface area is preferably 1500 m$^2$/g or less, more preferably 1200 m$^2$/g or less, further preferably 1000 m$^2$/g or less.

The BET specific surface area of the aluminum silicate is measured from nitrogen adsorptivity in accordance with JIS Z 8830. As the measurement device, for example, AUTOSORB-1 (trade name), manufactured by Quantachrome Instruments can be used. Since it is thought that moisture that is adsorbed to a surface or in a structure of a sample may affect gas adsorptivity, a pretreatment of removing moisture by heating is performed prior to measuring the BET specific surface area.

In the pretreatment, a measurement cell including 0.05 g of a measurement sample is subjected to decompression with a vacuum pump to 10 Pa or less, heated at 110° C., and retained for 3 hours or more. While maintaining the decompressed state, the measurement cell is naturally cooled to room temperature (25° C.). After the pretreatment, the BET specific surface area is measured at a measurement temperature of 77K and at a measurement pressure range of less than 1 in terms of a relative pressure (an equilibrium pressure with respect to a saturation vapor pressure).

From the viewpoint of improvement in metal ion adsorptivity, the aluminum silicate according to the second embodiment preferably has a total pore volume of 0.1 cm$^3$/g or more, more preferably 0.12 cm$^3$/g or more, further preferably 0.15 cm$^3$/g or more. The upper limit of the total pore volume is not particularly restricted. In view of the fact that part of Si and Al are bonded in the form of Si—O—Al and contribute to improvement in metal ion absorptivity, the total pore volume is preferably 1.5 cm$^3$/g or less, more preferably 1.2 cm$^3$/g or less, further preferably 1.0 cm$^3$/g or less.

The total pore volume of the aluminum silicate is calculated by converting a gas adsorption amount to a liquid, in which the gas adsorption amount is closest to relative pressure 1 among the data obtained within a range of from 0.95 to less than 1, based on the BET specific surface area.

<Method of Producing Aluminum Silicate>

An aluminum silicate that is a component of a metal ion adsorbent according to the second embodiment can be produced by the method as described below. The method of producing an aluminum silicate according to the second embodiment includes:

(a) a process of obtaining a reaction product by mixing a solution that includes silicate ions and a solution that includes aluminum ions;

(b) a process of subjecting the reaction product to desalting and solid separation;

(c) a process of subjecting a resultant of the solid separation in process (b) to a thermal treatment in an aqueous medium in the presence of an acid; and (d) a process of subjecting a resultant of the thermal treatment in process (c) to desalting and solid separation. The method may include other processes as necessary.

By subjecting a solution that includes an aluminum silicate as a reaction product to a thermal treatment in the presence of an acid, after removing coexisting ions by performing desalting, a metal ion adsorbent that exhibits excellent metal ion adsorptivity can be efficiently produced.

The reason for this is thought to be as follows, for example. By subjecting an aluminum silicate, from which coexisting ions that inhibit formation of a regular structure have been removed, to a thermal treatment in the presence of an acid, an aluminum silicate having a regular structure is formed. It is thought that an aluminum silicate having a regular structure exhibits an improved affinity with respect to metal ions and enables efficient metal ion adsorption.

(a) Process of Obtaining Reaction Product

In the process of obtaining a reaction product, a mixed solution that includes an aluminum silicate and coexisting ions is obtained as a reaction product by mixing a solution including silicate ions and a solution including aluminum ions.

(Silicate Ions and Aluminum Ions)

In order to synthesize an aluminum silicate, silicate ions and aluminum ions are required as the raw materials. The silicate source that constitutes a solution including silicate ions (hereinafter, also referred to as a "silicate solution") is not particularly limited as long as it generates silicate ions upon solvation. Examples of the silicate source include sodium orthosilicate, sodium metasilicate and tetraalkoxysilane such as tetraethoxysilane, but the silicate source is not limited thereto.

The aluminum source that constitutes a solution that includes aluminum ions (hereinafter, also referred to as an "aluminum solution") is not particularly limited as long as it generates aluminum ions upon solvation. Examples of the aluminum source include aluminum chloride, aluminum perchlorate, aluminum nitrate and aluminum sec-butoxide, but the aluminum source is not limited thereto.

The solvent may be appropriately selected from those that readily form a solvated state with a silicate source and an aluminum source as the raw materials. Specific examples include water and ethanol. From the viewpoint of readily reducing coexisting ions in a solvent during a thermal treatment, and from the viewpoint of handleability, water is preferred.

(Mixture Ratio and Concentration of Solution)

After preparing raw material solutions (silicate solution and aluminum solution) by dissolving the raw materials in a solvent, respectively, a mixed solution is obtained by mixing the raw material solutions. The element ratio of Si and Al in the mixed solution (Si/Al) based on a molar ratio is adjusted to a range of from 0.3 to 1.0, preferably from 0.4 to 0.6, more preferably from 0.45 to 0.55, in order to conform to an element ratio of Si and Al (Si/Al) of an aluminum silicate to be obtained. By adjusting the element ratio Si/Al to be a range of from 0.3 to 1.0, it tends to become easy to synthesize an aluminum silicate having a desired regular structure.

The mixing of the raw material solutions is preferably performed by gradually adding a silicate solution to an aluminum solution. In this way, polymerization of silicic acid, which may inhibit formation of a desired aluminum silicate, can be suppressed.

The silicon atom concentration of the silicate solution is not particularly limited, and preferably from 1 mmol/L to 1000 mmol/L.

When the silicon atom concentration of the silicate solution is 1 mmol/L or more, productivity is improved and an aluminum silicate can be efficiently produced. When the silicon atom concentration of the silicate solution is 1000 mmol/L or less, productivity is further improved depending on the silicon atom concentration of the silicate solution.

The aluminum atom concentration of the aluminum solution is not particularly limited, and preferably from 100 mmol/L to 1000 mmol/L.

When the aluminum atom concentration of the aluminum solution is 100 mmol/L or more, productivity is improved and an aluminum silicate can be efficiently produced. When the aluminum atom concentration of the aluminum solution is 1000 mmol/L or less, productivity is further improved in accordance with the aluminum atom concentration of the aluminum solution.

(b) First Washing Process (Desalting and Solid Separation)

After generating an aluminum silicate that includes coexisting ions as a reaction product by mixing a solution that includes silicate ions and a solution that includes aluminum ions, a first washing process of subjecting the aluminum silicate that includes coexisting ions to desalting and solid separation is performed. In the first washing process, the concentration of coexisting ions in the mixed solution is lowered by removing at least part of the coexisting ions from the mixed solution. By performing the first washing process, it tends to become easy to form an aluminum silicate having a desired regular structure in the synthesis process.

In the first washing process, the method of performing desalting and solid separation is not particularly limited as long as at least part of anions other than silicate ions (such as chloride ions or nitrate ions) and cations other than aluminum ions (such as sodium ions), which derive from a silicate source and an aluminum source, can be removed (desalting) and solid separation can be performed. Examples of the method for the first washing process include a method of using centrifugation, a method of using a dialytic membrane, and a method of using an ion exchange resin.

The first washing process is preferably performed in such a manner that the concentration of coexisting ions is not greater than a predetermined concentration. Specifically, for example, the first washing process is preferably performed in such a manner that a dispersion, which is prepared by dispersing a resultant of the solid separation in pure water so that the concentration of the resultant is 60 g/L, has an electric conductivity of 4.0 S/m or less, more preferably from 1.0 mS/m to 3.0 S/m, further preferably from 1.0 mS/m to 2.0 S/m.

When the electric conductivity of the dispersion is 4.0 S/m or less, it tends to become easy to form a desired aluminum silicate in the synthesis process.

The electric conductivity of the dispersion is measured at room temperature (25° C.) with F-55, manufactured by Horiba, Ltd., and a standard electric conductivity cell (9382-10D, manufactured by Horiba, Ltd.)

The first washing process preferably includes a process of obtaining a dispersion by dispersing the aluminum silicate in an aqueous medium, a process of adjusting the pH of the dispersion to 5 to 7, and a process of allowing an aluminum silicate to precipitate.

For example, in a case in which the first washing process is performed by centrifugation, the process may be as follows. The pH of the mixed solution is adjusted to 5 to 8 by adding an alkali or the like. After subjecting the solution with an adjusted pH to centrifugation, a gel-like precipitation is obtained by the solid separation by eliminating a supernatant. The precipitation obtained by the solid separation is redispersed in a solvent. The dispersion obtained by the redispersion preferably has the same volume as the dispersion prior to the solid separation. The dispersion obtained by the redispersion is subjected to further desalting and solid separation in a similar manner by centrifugation. Through the process, the concentration of coexisting ions becomes not greater than a predetermined concentration.

In the first washing process, the pH is adjusted to be from 5 to 8, for example. The pH is preferably from 5.5 to 6.8, more preferably from 5.8 to 6.5. The alkali used for the pH adjustment is not particularly limited. For example, sodium hydroxide, ammonia or the like is preferably used.

The conditions for centrifugation may be appropriately selected according to the production scale, the type of the container to be used for centrifugation, or the like. For example, the centrifugation can be performed at 1200 G or more for a time of from 1 to 30 minutes. Specifically, for example, in a case in which a centrifugal separation machine (Suprema 23, manufactured by Tomy Seiko Co. Ltd.) and a standard rotor (NA-16, manufactured by Tomy Seiko Co. Ltd.) are used, the centrifugation may be performed at room temperature, at 3000 rpm (1450 G) or more, for a time of from 5 to 10 minutes.

The solvent used in the first washing process may be appropriately selected from those that readily form a solvated state with the raw materials. Specific examples include water and ethanol. Water is preferred in view of reducing coexisting ions in the solution during thermal synthesis, and from the viewpoint of handleability, and pure water is more preferred. In a case in which washing is repeated plural times, it is preferred to omit pH adjustment.

The number of performing desalting and solid separation in the first washing process may be determined as appropriate according to the remaining amount of coexisting ions. For example, the number of the first washing process may be from 1 to 6. When the washing is repeated approximately three times, the remaining amount of coexisting ions may be reduced so that the coexisting ions do not affect the synthesis of an aluminum silicate.

The measurement of pH for the pH adjustment may be performed with a pH meter using a standard glass electrode. Specific examples of the pH meter include MODEL (F-51) (trade name), manufactured by Horiba, Ltd.

(c) Synthesis Process

In the synthesis process, a resultant of the solid separation in the first washing process is subjected to a thermal treatment in an aqueous medium in the presence of an acid.

By performing a thermal treatment of a solution (dispersion) that includes an aluminum silicate in which the amount of coexisting ions has been lowered, an aluminum silicate having a regular structure can be formed.

The synthesis process may be performed with a thin solution by appropriately diluting the resultant of the solid separation in the first washing process, or may be performed with a solution that includes the resultant of the solid separation of the first washing process at high concentration.

When the synthesis process is performed with a thin solution, an aluminum silicate having a structure in which a regular structure is extended in a tubular form (hereinafter, also referred to as a "first aluminum silicate") can be obtained. When the synthesis process is performed with a high-concentration solution, an aluminum silicate that has a clay structure and an amorphous structure, in addition to a regular structure (hereinafter, also referred to as a "second aluminum silicate") can be obtained. In the second aluminum silicate, it is assumed that formation of a clay structure and an amorphous structure is increased instead of growing into a tubular object having a length of 50 nm or more.

Both of the first and second aluminum silicates exhibit excellent metal ion adsorptivity due to their specific regular structures.

The dilution conditions for obtaining a first aluminum silicate in the synthesis process may be, for example, a silicate atom concentration of 20 mmol/L or less and an aluminum atom concentration of 60 mmol/L or less. From the viewpoint of metal ion adsorptivity, the conditions are preferably a silicate atom concentration of from 0.1 mmol/L to 10 mmol/L and an aluminum atom concentration of from 0.1 mmol/L to 34 mmol/L, more preferably a silicate atom concentration of from 0.1 mmol/L to 2 mmol/L and an aluminum atom concentration of from 0.1 mmol/L to 7 mmol/L.

When the silicon atom concentration is 20 mmol/L or less and the aluminum atom concentration is 60 mmol/L or less, a first aluminum silicate can be efficiently produced.

The high-concentration conditions for obtaining a second aluminum silicate in the synthesis process may be, for example, a silicate atom concentration of 100 mmol/L or more and an aluminum atom concentration of 100 mmol/L or more. From the viewpoint of metal ion adsorptivity, the conditions are preferably a silicate atom concentration of from 120 mmol/L to 2000 mmol/L and an aluminum atom concentration of from 120 mmol/L to 2000 mmol/L, more preferably a silicate atom concentration of from 150 mmol/L to 1500 mmol/L and an aluminum atom concentration of from 150 mmol/L to 1500 mmol/L.

When the silicon atom concentration is 100 mmol/L or more and the aluminum atom concentration is 100 mmol/L or more, a second aluminum silicate can be efficiently produced and productivity of the aluminum silicate is improved.

The silicon atom concentration and the aluminum atom concentration set forth above refer to a silicon atom concentration and an aluminum ion concentration after adjusting the pH to a predetermined range by adding an acidic compound as mentioned later.

The silicon atom concentration and the aluminum atom concentration are measured with an ICP optical emission spectrometer (for example, P-4010, manufactured by Hitachi, Ltd.)

In order to adjust the silicon atom concentration and the aluminum atom concentration to the predetermined concentrations, a solvent may be added. The solvent may be selected as appropriate from those that readily form a solvated state with the raw materials. Specific examples of the solvent include water and ethanol. Water is preferred from the viewpoint of reducing coexisting ions in a solution during a thermal treatment, and from the viewpoint of handleability.

In the synthesis process, at least one acidic compound is added prior to performing a thermal treatment. The pH after the addition of an acidic compound is not particularly limited. From the viewpoint of efficiently obtaining a desired aluminum silicate, the pH is preferably from 3 to less than 7, more preferably from 3 to 5.

The acidic compound to be added in the synthesis process is not particularly limited, and may be an organic acid or an inorganic acid. The acidic compound is preferably an inorganic acid. Specific examples of the inorganic acid include hydrochloric acid, perchloric acid and nitric acid. In consideration of reducing coexisting ions in the solution in the thermal treatment, an acidic compound that generates an anion that is similar to an anion included in an aluminum source is preferred.

By performing a thermal treatment after adding an acidic compound, an aluminum silicate that has a desired structure can be obtained.

The temperature for the thermal treatment is not particularly limited. From the viewpoint of efficiently obtaining a desired aluminum silicate, the temperature is preferably from 80° C. to 160° C.

When the temperature for the thermal treatment is 160° C. or lower, precipitation of boehmite (aluminum hydroxide) tends to be suppressed. When the temperature for the thermal treatment is 80° C. or higher, the rate of synthesis of a desired aluminum silicate may improve and production thereof may be more efficient.

The time for the thermal treatment is not particularly limited. From the viewpoint of obtaining an aluminum silicate having a desired structure more efficiently, the time is preferably within 96 hours (4 days).

When the time for the thermal treatment is within 96 hours, an aluminum silicate having a desired structure can be produced more efficiently.

(d) Second Washing Process (Desalting and Solid Separation)

The resultant obtained by performing a thermal treatment in the synthesis process is subjected to desalting and solid separation in the second washing process. By performing the second washing process, a metal ion adsorbent that exhibits excellent metal ion adsorptivity can be obtained. The reason for this is thought to be as follows. In a case of a resultant obtained by performing a thermal treatment in the synthesis process, adsorption sites of an aluminum silicate may be covered with coexisting ions, and the metal adsorption adsorptivity may be less than expected. Therefore, by performing a second washing process, in which at least part of coexisting ions are removed by desalting and solid separation from an aluminum silicate obtained by performing a thermal treatment in the synthesis process, an aluminum silicate that exhibits excellent metal ion adsorptivity can be obtained.

The second washing process may be the same or different from the first washing process performed prior to the synthesis process, as long as at least part of anions other than silicate ions and at least part of cations other than aluminum ions can be removed.

The second washing process is preferably performed such that the concentration of coexisting ions is not greater than a predetermined concentration. Specifically, for example, the second washing process is preferably performed such that a dispersion, which is obtained by dispersing a resultant of the solid separation performed in the second washing process in pure water so that the concentration of the resultant is 60 g/L, has an electric conductivity of 4.0 S/m or less, more preferably from 1.0 mS/m to 3.0 S/m, further preferably from 1.0 mS/m to 2.0 S/m.

When the electric conductivity of the dispersion is 4.0 S/m or less, an aluminum silicate that exhibits even more excellent metal ion adsorptivity tends to be readily obtained.

In a case in which the second washing process is performed by centrifugation, for example, the process can be performed as follows. The pH is adjusted to 5 to 10 by adding an alkali or the like to a mixed solution. After subjecting the solution after adjusting the pH thereof to centrifugation, a gel-like precipitation is obtained by solid separation by eliminating a supernatant. The precipitation obtained by the solid separation is redispersed in a solvent. The dispersion obtained by the redispersion preferably has the same volume as the dispersion prior to being subjected to the solid separation. The dispersion obtained by the redispersion is subjected to further desalting and solid separation in a similar manner by centrifugation. Through the process, the concentration of coexisting ions becomes not greater than a predetermined concentration.

In the second washing process, the pH is adjusted to be from 5 to 10, for example, preferably from 8 to 10. The alkali used for the pH adjustment is not particularly limited. For example, sodium hydroxide, ammonia or the like is preferably used.

The conditions for centrifugation may be appropriately selected according to the production scale, the type of the container to be used for centrifugation, or the like. For example, the centrifugation can be performed at 1200 G or more for a time of from 1 to 30 minutes. Specifically, for example, in a case in which a centrifugal separation machine (Suprema 23, manufactured by Tomy Seiko Co. Ltd.) and a standard rotor (NA-16, manufactured by Tomy Seiko Co. Ltd.) are used, the centrifugation may be performed at room temperature, at 3000 rpm (1450 G) or more, for a time of from 5 to 10 minutes.

The solvent used in the second washing process may be appropriately selected from those that readily form a solvated state with the raw materials. Specific examples include water and ethanol. Water is preferred in view of reducing coexisting ions, and from the viewpoint of handleability, and pure water is more preferred. In a case in which washing is repeated plural times, it is preferred to omit pH adjustment.

The number of performing desalting and solid separation in the second washing process may be determined as appropriate according to the remaining amount of coexisting ions. For example, the number of the second washing process may be from 1 to 6. When the washing is repeated approximately three times, the remaining amount of coexisting ions in the metal ion adsorbent may be sufficiently reduced.

In the dispersion after performing the second washing process, it is especially preferred that the concentrations of chloride ions and sodium ions, which may affect adsorptivity of a metal ion adsorbent, are reduced. Specifically, the metal ion adsorbent after subjecting to washing in the second washing process preferably has a chloride ion concentration of 100 mg/L or less and a sodium ion concentration of 100 mg/L or less when an aqueous dispersion is prepared by dispersing the metal ion adsorbent in water such that the concentration of the metal ion adsorbent is 400 mg/L. When the chloride ion concentration is 100 mg/L or less and a sodium ion concentration is 100 mg/L or less, adsorptivity can be even more improved. The chloride ion concentration is more preferably 50 mg/L or less, further preferably 10 mg/L or less. The sodium ion concentration is more preferably 50 mg/L or less, further preferably 10 mg/L or less. The chloride ion concentration and the sodium ion concentration may be adjusted by the number of times of performing a washing process or the type of an alkali to be used for the pH adjustment.

The chloride ion concentration and the sodium ion concentration may be measured by an ordinary method by an ion chromatography system (for example, DX-320 and DX-100, manufactured by Dionex Corporation).

The concentration of an aluminum silicate in the dispersion is based on the mass of a solid obtained by drying a resultant of the solid separation at 110° C. for 24 hours as a standard.

The "dispersion after the second washing process" refers to a dispersion whose volume is adjusted with a solvent to be the same as the volume prior to the second washing process. The solvent may be selected as appropriate from those that readily form a solvated state with the raw materials. Specific examples include water and ethanol. The solvent is preferably water from the viewpoint of reducing coexisting ions in the metal ion adsorbent, and from the viewpoint of handleability.

The BET specific surface area of the aluminum silicate may be adjusted by a method for performing the second washing process (for example, a method of performing one or more treatments that include adding an alkali to a synthesis solution to adjust the pH to 5 to 10, subjecting the solution to centrifugation, obtaining an aluminum silicate as a gel-like precipitate by eliminating a supernatant, redispersing the aluminum silicate in a solvent, and adjusting the volume to that prior to the centrifugation).

The total pore volume of the aluminum silicate may be adjusted by a method for performing the second washing process (for example, a method of performing one or more treatments that include adding an alkali to a synthesis solution to adjust the pH to 5 to 10, subjecting the solution to centrifugation, obtaining an aluminum silicate as a gel-like precipitate by eliminating a supernatant, redispersing the aluminum silicate in a solvent, and adjusting the volume to that prior to the centrifugation).

The average pore diameter of the aluminum silicate may be adjusted by a method for performing the second washing process (for example, a method of performing one or more treatments that include adding an alkali to a synthesis solution to adjust the pH to 5 to 10, subjecting the solution to centrifugation, obtaining an aluminum silicate as a gel-like precipitate by eliminating a supernatant, redispersing the aluminum silicate in a solvent, and adjusting the volume to that prior to the centrifugation).

<Metal Ion Adsorbent>

The metal ion adsorbent according to the second embodiment is formed from an aluminum silicate as described above, and is useful as an adsorbent with respect to metal ions. More specifically, the metal ion adsorbent may be used as a filter obtained by coating a honeycomb-shaped support or a porous support having a liquid permeability with the metal ion adsorbent; as a filler to be packed in a container that is formed by coating a granular or spherical support with the metal ion adsorbent; or as the metal ion adsorbent itself. The support is not particularly limited, and examples include metals, ceramics, cured synthetic resins and natural materials such as wood.

Specific examples of the metal ion that can be efficiently adsorbed by the metal ion adsorbent include nickel ions, copper ions and manganese ions.

EXAMPLES

In the following, the invention is described more details with reference to the examples. However, the invention is not limited to the examples.

Production Example 1

<Preparation of Aluminum Silicate>

An aqueous solution (500 mL) of sodium orthosilicate having a concentration of 350 mmol/L was added to an aqueous solution (500 mL) of aluminum chloride having a concentration of 700 mmol/L, and the mixed solution was stirred for 30 minutes. The resulting solution was added with 330 mL of an aqueous solution of sodium hydroxide having a concentration of 1 mol/L, and the pH of the solution was adjusted to 6.1.

The solution after the pH adjustment was stirred for 30 minutes, and subjected to centrifugation at a rate of 3,000 rotations per minute for 5 minutes with a centrifugal separator (SUPREMA 23 with a standard rotor NA-16, manufactured by Tomy Co., Ltd.) After the centrifugation, a supernatant was eliminated and a gel-like precipitate was redispersed in pure water such that the dispersion obtained by the redispersion had the same volume as the dispersion prior to being subjected to centrifugation. The desalting by centrifugation was performed three times.

The gel-like precipitate obtained by eliminating a supernatant in the third desalting was dispersed in pure water such that the concentration of the precipitate was 60 g/L, and an electric conductivity of the dispersion was measured at room temperature (25° C.) with F-55, manufactured by Horiba Co., Ltd. and an electric conductivity cell (9382-10D, manufactured by Horiba Co., Ltd.) The electric conductivity was 1.3 S/m.

The gel-like precipitate obtained by eliminating a supernatant in the third desalting was added with 135 mL of hydrochloric acid having a concentration of 1 mol/L to adjust the pH to 3.5, and the solution was stirred for 30 minutes. The concentration of silicon atoms and the concentration of aluminum atoms in the solution at that time were measured by an ordinary method with an ICP optical emission spectrometer (P-4010, manufactured by Hitachi Ltd.) The silicon atom concentration was 213 mmol/L and the aluminum atom concentration was 426 mmol/L.

Next, the solution was heated in a drying oven at 98° C. for 48 hours (2 days).

The solution after the heating (aluminum silicate concentration: 47 g/L) was added with 188 mL of an aqueous solution of sodium hydroxide having a concentration of 1 mol/L, thereby adjusting the pH to 9.1. By the pH adjustment, an aluminum silicate in the solution was allowed to aggregate, and a supernatant was eliminated by allowing the aggregate to precipitate by performing centrifugation in the same manner as the above. Then, desalting was performed three times by adding pure water to the precipitate so that the volume was the same as that prior to centrifugation.

A gel-like precipitate obtained after the elimination of a supernatant in the third desalting was dispersed in pure water such that the concentration of the precipitate was 60 g/L, and an electric conductivity was measured at room temperature (25° C.) with F-55, manufactured by Horiba Co., Ltd. and an electric conductivity cell (9382-10D, manufactured by Horiba Co., Ltd.). The electric conductivity was 0.6 S/m.

The gel-like precipitate obtained after the elimination of a supernatant in the third desalting was dried at 60° C. for 16 hours, thereby obtaining 30 g of a powder. The powder was used as Sample A.

<BET Specific Surface Area, Total Pore Volume and Average Pore Diameter>

A BET specific surface area, a total pore volume, and an average pore diameter of Sample A were measured from nitrogen adsorptivity. As an evaluation apparatus, AUTOSORB-1 (trade name, manufactured by Quantachrome Corporation) was used. The measurement was conducted after performing a pretreatment as described below, at an evaluation temperature of 77 K and an evaluation pressure range of less than 1 as a relative pressure (an equilibrium pressure with respect to a saturation vapor pressure).

The pretreatment was conducted by performing decompression with a vacuum pump and heating with respect to a measurement cell containing 0.05 g of Sample A. Specifically, the pretreatment was performed by reducing the pressure to 10 Pa or less, heating at 110° C. and maintaining the state for 3 hours or more, and naturally cooling to room temperature (25° C.) while maintaining the decompressed state.

As a result, Sample A had a BET specific surface area of 363 $m^2/g$, a total pore volume of 0.22 $cm^3/g$, and an average pore diameter of 2.4 nm.

<Powder X-Ray Diffraction>

Powder X-ray diffraction was performed with GEIGER-FLEX RAD-2X, trade name, manufactured by Rigaku Corporation, using a CuKα ray as an X-ray source. FIG. 1 shows a powder X-ray diffraction spectrum of Sample A. Broad peaks were observed at approximately 2θ=26.9° and 40.3°. In addition, sharp peaks were observed at approximately 2θ=18.8°, 20.3°, 27.8°, 40.6° and 53.3°.

<$^{27}$Al-NMR>

A $^{27}$Al-NMR spectrum was measured with AV 400 WB, manufactured by Bruker BioSpin K.K., under the following conditions.

Resonance frequency: 104 MHz
Measurement method: MAS (single pulse)
MAS rotation rate: 10 kHz
Measurement range: 52 kHz
Number of data points: 4096
Resolution (measurement range/number of data points): 12.7 Hz
Pulse width: 3.0 μsec
Delay time: 2 seconds
Chemical shift value standard: 3.94 ppm of alpha-alumina
Window function: exponential function
Line broadening coefficient: 10 Hz FIG. 2 shows a $^{27}$Al-NMR spectrum of Sample A. As indicated in FIG. 2, a peak was observed at approximately 3 ppm, and a slight peak was observed at approximately 55 ppm. An area ratio of the peak at approximately 55 ppm to the peak at approximately 3 ppm was 15%.

<$^{29}$Si-NMR>

The $^{29}$Si-NMR spectrum was measured with AV 400 WB, manufactured by Bruker BioSpin K.K., under the following conditions:

Resonance frequency: 79.5 MHz
Measurement method: MAS (single pulse)
MAS rotation rate: 6 kHz
Measurement range: 24 kHz
Number of data points: 2048
Resolution (measurement range/number of data points): 5.8 Hz
Pulse width: 4.7 μsec
Delay time: 600 seconds
Chemical shift value standard: 1.52 ppm of TMSP-$d_4$ (sodium 3-(trimethylsilyl) (2,2,3,3-$^2H_4$) propionate)
Window function: exponential function
Line broadening coefficient: 50 Hz FIG. 3 shows a $^{29}$Si-NMR spectrum of Sample A. As shown in FIG. 3, peaks were observed at approximately −78 ppm and at approximately −85 ppm, respectively. The areas of the peaks at approximately −78 ppm and at approximately −85 ppm were measured by the above method, respectively. The area of peak B at approximately −85 ppm with respect to the area of the peak A at approximately −78 ppm was 2.61, given that the area of peak A was 1.00.

<Element Ratio Si/Al>

An element ratio Si/Al obtained from ICP optical emission spectrometry analysis with an ICP optical emission spectrometer (P-4010, manufactured by Hitachi Ltd.) performed by an ordinary method was 0.5.

<Transmission Electron Microscope (TEM) Photograph Observation>

FIG. 4 shows a transmission electron microscope (TEM) photograph of Sample A taken at a magnification of 100,000. The TEM observation was performed with a transmission electron microscope (H-7100 FA, manufactured by Hitachi High-Technology Corporation) at an accelerating voltage of 100 kV. Preparation of Sample A for the TEM observation was performed in the following manner. Specifically, the solution after the heating and prior to the final desalting (aluminum silicate concentration: 47 g/L) was diluted with pure water to 10 times, and the diluted solution was subjected to ultrasonic irradiation for 5 minutes. The resulting solution was dropped onto a support for TEM observation sample preparation, and naturally dried to form a thin membrane.

As shown in FIG. 4, no tubular object having a length of 50 nm or more was observed.

<Metal Ion Adsorptivity>

Metal ion adsorptivity was evaluated by ICP optical emission spectrometry analysis (with an ICP optical emission spectrometer P-4010, manufactured by Hitachi Ltd).

Prior to evaluating metal ion adsorptivity, a metal ion solution containing $Ni^{2+}$ at 100 ppm and a metal ion solution containing $Mn^{2+}$ at 100 ppm were prepared from pure water and a metal sulfate of nickel or a metal sulfate of manganese, respectively. Each of the metal ion solutions was added with Sample A at a concentration of 1.0% by mass, and thoroughly stirred and allowed to stand. The concentration of the metal ion of the metal ion solution before and after the addition of Sample A was measured by ICP optical emission spectrometry analysis.

The concentration of $Ni^{2+}$ after the addition of Sample A was less than 5 ppm, and the concentration of $Mn^{2+}$ after the addition of Sample A was 10 ppm, respectively.

Comparative Example 1

A commercially available activated carbon (activated carbon, pulverized, 2 mm to 5 mm, manufactured by Wako Pure Chemical Industries) was used as Sample B. Regarding metal ion adsorptivity, the concentrations of $Ni^{2+}$ and $Mn^{2+}$ after the addition of Sample B were 50 ppm and 60 ppm, respectively.

Comparative Example 2

A commercially available silica gel (granules (white color), manufactured by Wako Pure Chemical Industries) was used as Sample C. Regarding metal ion adsorptivity, the concentrations of $Ni^{2+}$ and $Mn^{2+}$ after the addition of Sample C were 100 ppm and 100 ppm, respectively.

Comparative Example 3

A commercially available zeolite 4 A (molecular sieves 4 A, manufactured by Wako Pure Chemical Industries) was used as Sample D. Regarding metal ion adsorptivity, the concentrations of $Ni^{2+}$ and $Mn^{2+}$ after the addition of Sample D were 30 ppm and 10 ppm, respectively.

Further, the $Mn^{2+}$ solution became cloudy and brown in color after adding zeolite A4 and allowing to stand.

TABLE 1

| Sample | | Concentration after addition of sample [ppm] | |
|---|---|---|---|
| | | $Ni^{2+}$ | $Mn^{2+}$ |
| Sample A | Aluminum silicate | <5 | 10 |
| Sample B | Activated carbon | 50 | 60 |
| Sample C | Silica gel | 100 | 100 |
| Sample D | Zeolite 4A | 30 | 10 |

Production Example 2

<Preparation of Aluminum Silicate>

An aqueous solution (500 mL) of sodium orthosilicate having a concentration of 74 mmol/L was added to an aqueous solution (500 mL) of aluminum chloride having a concentration of 180 mmol/L, and the mixed solution was stirred for 30 minutes. The resulting solution was added with 93 mL of an aqueous solution of sodium hydroxide having a concentration of 1 mol/L, whereby the pH was adjusted to 7.0.

The solution after the pH adjustment was stirred for 30 minutes, and subjected to centrifugation at a rate of 3,000 rotations per minute for 5 minutes with a centrifugal separator (SUPREMA 23 and the standard rotor NA-16, manufactured by Tomy Co., Ltd.) After the centrifugation, a supernatant was eliminated and a gel-like precipitate was redispersed in pure water such that the dispersion obtained by the redispersion had the same volume as the dispersion prior to being subjected to centrifugation. The desalting by centrifugation was performed three times.

The gel-like precipitate obtained by eliminating a supernatant in the third desalting was dispersed in pure water such that the concentration of the precipitate was 60 g/L, and an electric conductivity of the dispersion was measured at room temperature (25° C.) with F-55, manufactured by Horiba Co., Ltd. and an electric conductivity cell (9382-10D, manufactured by Horiba Co., Ltd.). The electric conductivity was 1.3 S/m.

The gel-like precipitate obtained by eliminating a supernatant in the third desalting was added with pure water, and the volume was made to 12 L. The solution was added with 60 mL of hydrochloric acid having a concentration of 1 mol/L to adjust the pH to 4.0, and the solution was stirred for 30 minutes. The concentration of silicon atoms and the concentration of aluminum atoms in the solution at that time were measured by an ordinary method with an ICP optical emission spectrometer (P-4010, manufactured by Hitachi Ltd.) The silicon atom concentration was 2 mmol/L and an aluminum atom concentration was 4 mmol/L.

Next, the solution was heated in a drying oven at 98° C. for 96 hours (4 days).

The solution after the heating (aluminum silicate concentration: 0.4 g/L) was added with 60 mL of an aqueous solution of sodium hydroxide having a concentration of 1 mol/L, thereby adjusting the pH to 9.0. By the pH adjustment, an aluminum silicate in the solution was allowed to aggregate, and a supernatant was eliminated by allowing the aggregate to precipitate by performing centrifugation in the same manner as the above. Then, desalting was performed three times by adding pure water to the precipitate so that the volume was the same as that prior to centrifugation.

A gel-like precipitate obtained after the elimination of a supernatant in the third desalting was adjusted so that the concentration was 60 g/L, and an electric conductivity was measured at room temperature (25° C.) with F-55, manufactured by Horiba Co., Ltd., and an electric conductivity cell (9382-10D, manufactured by Horiba Co., Ltd.) The electric conductivity was 0.6 S/m.

The gel-like precipitate obtained after the elimination of a supernatant in the third desalting was dried at 60° C. for 72 hours (3 days), thereby obtaining 4.8 g of a powder. The powder was used as Sample E.

<BET Specific Surface Area, Total Pore Volume and Average Pore Diameter>

A BET specific surface area, a total pore volume, and an average pore diameter of Sample E were measured from nitrogen adsorptivity, in the same manner as Production Example 1.

As a result, Sample E had a BET specific surface area of 323 $m^2/g$, a total pore volume of 0.22 $cm^3/g$, and an average pore diameter of 2.7 nm.

<Powder X-Ray Diffraction>

Powder X-ray diffraction of Sample E was performed in the same manner as Production Example 1. FIG. 1 shows a powder X-ray diffraction spectrum of Sample E, in which broad peaks sere observed at approximately $2\theta=4.8°$, 9.7°, 14.0°, 18.3°, 27.3° and 40.8°.

<$^{27}$Al-NMR>

FIG. 2 shows a $^{27}$Al-NMR spectrum of Sample E. As shown in FIG. 2, a peak was observed at approximately 3 ppm, and a slight peak was observed at approximately 55 ppm. An area ratio of the peak at approximately 55 ppm with respect to the peak at approximately 3 ppm was 4%.

<$^{29}$Si-NMR>

FIG. 3 shows a $^{29}$Si-NMR spectrum of Sample E. As shown in FIG. 3, peaks were observed at approximately −78 ppm and at approximately −85 ppm, respectively. The areas of the peaks at approximately −78 ppm and at approximately −85 ppm were measured by the above method. As a result, the area of peak B at approximately −85 ppm with respect to peak A at approximately −78 ppm was 0.44, given that the area of peak A was 1.00.

<Element Ratio Si/Al>

An element ratio Si/Al obtained from ICP optical emission spectrometry analysis with an ICP optical emission spectrometer (P-4010, manufactured by Hitachi Ltd.) performed by an ordinary method was 0.5.

<Transmission Electron Microscope (TEM) Photograph Observation>

FIG. 5 shows a transmission electron microscope (TEM) photograph of Sample E at a magnification of 100,000 in a similar manner to Example 1. As shown in FIG. 5, tubular objects were generated. The length of tubular objects 10a in a lengthwise direction was approximately from 1 nm to 10 μm, an outer diameter was approximately from 1.5 to 3.0 nm, and an inner diameter was approximately from 0.7 to 1.4 nm.

<Metal Ion Adsorptivity>

$Mn^{2+}$ ion adsorptivity was evaluated by the same manner as Production Example 1. As a result, Sample E exhibited a metal ion adsorptivity that was equivalent to that of Sample A.

[Evaluation of Metal Ion Adsorptivity 1]

Metal ion adsorptivity was evaluated by the method as described in Production Example 1 using Sample A, except that the amount of Sample A was changed as described in the following table. Results of the evaluation are indicated in the table.

TABLE 2

| Amount of addition of Sample A [% by mass] | $Mn^{2+}$ concentration after addition of Sample A [ppm] |
|---|---|
| 0.0 | 100 |
| 0.5 | 50 |
| 2.0 | 5 |

As shown in the Table, when Sample A was added in an amount of 0.5% by mass, the manganese ion concentration was halved. When Sample A was added in an amount of 2.0% by mass, 95% of manganese ions were captured.

[Evaluation of Metal Ion Adsorptivity 2]

Metal ion adsorptivity was evaluated by the method as described in Production Example 1 using Sample A, except that the metal ion was changed to $Cu^{2+}$ and the metal ion concentration was changed to 400 ppm. The pH at that time was 5.1. The concentration of $Cu^{2+}$ after addition of Sample A was 160 ppm.

The disclosure of Japanese Patent Application Nos. 2011-054787, 2011-054788, 2011-054857 and 2011-054858 are incorporated by reference herein. All publications, patent applications, and technical standards mentioned in this specification are herein incorporated by reference to the same extent as if each individual publication, patent application, or technical standard was specifically and individually indicated to be incorporated by reference.

The invention claimed is:

1. An aluminum silicate, having:
    an element ratio of Si and Al, represented by Si/Al, of from 0.3 to 1.0 by molar ratio;
    a peak at approximately 3 pmm in a $^{27}$Al-NMR spectrum;
    a peak at approximately −78 ppm and a peak at approximately −85 ppm in a $^{29}$Si-NMR spectrum;
    peaks at approximately 2θ=26.9°, 18.8°, 20.3°, 27.8°, 40.3°, 40.6° and 53.3° in a powder X-ray diffraction spectrum in which a CuKα ray is used as an X-ray source; and
    an area ratio of peak A and peak B, represented by peak B/peak A, of from 2.0 to 9.0, wherein peak A is at approximately −78 ppm and peak B is at approximately −85 ppm, in a $^{29}$Si-NMR spectrum.

2. The aluminum silicate according to claim 1, wherein the aluminum silicate does not comprise a tubular substance having a length of 50 nm or more as observed in a transmission electron microscope (TEM) photograph of the aluminum silicate taken at a magnification of 100,000.

3. The aluminum silicate according to claim 1, wherein the aluminum silicate has a BET specific surface area of 250 m$^2$/g or more, a total pore volume of 0.1 cm$^3$/g or more, and an average pore diameter of 1.5 nm or more.

4. A method of producing the aluminum silicate according to claim 1, the method comprising:
    (a) a process of obtaining a reaction product by mixing a solution that includes silicate ions and solution that includes aluminum ions;
    (b) a process subjecting the reaction product to desalting and solid separation;
    (c) a process of subjecting a resultant of the solid separation in process (b) to a thermal treatment in an aqueous medium in the present of an acid, under concentration conditions such that a silicon atom concentration is 100 mmol/L or more and an aluminum atom concentration is 100 mmol/L or more; and
    (d) a process of subjecting a resultant of the thermal treatment in process (c) to desalting and solid separation.

5. The method of producing the aluminum silicate according to claim 4, wherein the resultant of the solid separation in process (b) has an electric conductivity of 4.0 S/m or less when the resultant is dispersed in water such that a concentration of the resultant is 60 g/L.

6. The method of producing the aluminum silicate according to claim 4, wherein the thermal treatment in process (c) is performed with a pH of from 3 to less than 7, at a temperature of from 80° C. to 160° C. and for time of within 96 hours.

7. The method for producing the aluminum silicate according to claim 4, wherein in process (a), the solution that includes silicate ions has a silicon atom concentration of 100 mmol/L or more, the solution that includes aluminum ions has an aluminum atom concentration of 100 mmol/L, and the mixing is performed such that an element ration of the aluminum with to silicon, represented by Si/Al, is from 0.3 to 1.0 by molar ratio.

8. The method of producing the aluminum silicate according to claim 4, wherein process (b) comprises a process of obtaining a dispersion by dispersing the reaction product in an aqueous medium and a process of performing solid separation with a pH of the dispersion adjusted to from 5 to 7.

9. An aluminum silicate, having:
    an element ratio of Si and Al, represented by Si/Al, of from 0.3 to 1.0 by molar ratio;
    a peak at approximately 3 pmm in a $^{27}$Al-NMR spectrum;
    a peak at approximately −78 ppm and a peak at approximately −85 ppm in a $^{29}$Si-NMR spectrum; and
    peaks at approximately 2θ=26.9°, 18.8°, 20.3°, 27.8°, 40.3°, 40.6° and 53.3° in a powder X-ray diffraction spectrum in which a CuKα ray is used as an X-ray source,
    the aluminum silicate not comprising a tubular substance having a length of 50 nm or more as observed in a transmission electron microscope (TEM) photograph of the aluminum silicate taken at a magnification of 100,000.

10. The aluminum silicate according to claim 9, wherein aluminum silicate has a BET specific surface area of 250 m²/g or more, a total pore volume of 0.1 cm³/g or more, and an average pore diameter of 1.5 nm or more.

11. A metal ion adsorbent, comprising an aluminum silicate having:
- an element ratio of Si and Al, represented by Si/Al, of from 0.3 to 1.0 by molar ratio;
- a peak at approximately 3 pmm in a $^{27}$Al-NMR spectrum;
- a peak at approximately −78 ppm and a peak at approximately −85 ppm in a $^{29}$Si-NMR spectrum;
- an area ratio of peak A and peak B, represented by peak B/peak A, of from 2.0 to 9.0, wherein peak A is at approximately −78 ppm and peak B is at approximately −85 ppm, in a $^{29}$Si-NMR spectrum; and
- peaks at approximately 2θ=26.9°, 18.8°, 20.3°, 27.8°, 40.3°, 40.6° and 53.3° in a powder X-ray diffraction spectrum in which a CuKα ray is used as an X-ray source.

12. The metal ion adsorbent according to claim 11, wherein the aluminum silicate does not comprise a tubular substance having a length of 50 nm or more as observed in a transmission electron microscope (TEM) photograph of the aluminum silicate taken at a magnification of 100,000.

13. The metal ion adsorbent according to claim 11, wherein the aluminum silicate has a BET specific surface area of 250 m²/g or more, a total pore volume of 0.1 cm³/g or more, and an average pore diameter of 1.5 nm or more.

14. A method of producing the metal ion adsorbent according to claim 11, the comprising:
- (a) a process of obtaining a reaction product by mixing a solution that includes silicate ions and solution that includes aluminum ions;
- (b) a process subjecting the reaction product to desalting and solid separation;
- (c) a process of subjecting a resultant of the solid separation in process (b) to a thermal treatment in an aqueous medium in the present of an acid; and
- (d) a process of subjecting a resultant of the thermal treatment in process (c) to desalting and solid separation.

15. The method of producing the aluminum silicate according to claim 14, wherein the treatment in process (c) is performed under concentration conditions in the aqueous medium such that a silicon atom concentration is 100 mmol/L or more and an aluminum atom concentration is 100 mmol/L or more.

16. The method of producing the metal ion adsorbent according to claim 14, wherein the resultant of the solid separation in process (b) has an electric conductivity of 4.0 S/m or less when the resultant is dispersed in water such that a concentration of the resultant is 60 g/L.

17. The method of producing the metal ion adsorbent according to claim 14, wherein the thermal treatment in process (c) is performed with a pH of from 3 to less than 7, at a temperature of 80° C. to 160° C. and for a time of within 96 hours.

18. The method of producing the metal ion adsorbent according to claim 14, wherein in process (a), the solution that includes silicate ions has a silicon atom concentration of 100 mmol/L or more, the solution that includes aluminum ions has an aluminum atom concentration of 100 mmol/L, and the mixing is performed such that an element ration of the aluminum with to silicon, represented by Si/Al, is from 0.3 to 1.0 by molar ratio.

19. The method of producing the metal ion adsorbent according to claim 14, wherein process (b) comprises a process of obtaining a dispersion by dispersing the reaction product in an aqueous medium and a process of performing solid separation with a pH of the dispersion adjusted to from 5 to 7.

* * * * *